United States Patent
Pack et al.

(10) Patent No.: US 8,571,745 B2
(45) Date of Patent: Oct. 29, 2013

(54) ADVANCED BEHAVIOR ENGINE

(76) Inventors: Robert Todd Pack, Nashua, NH (US);
Orjeta Taka, Peabody, MA (US)

( * ) Notice: Subject to any disclaimer, the term of this patent is extended or adjusted under 35 U.S.C. 154(b) by 258 days.

(21) Appl. No.: 13/105,872

(22) Filed: May 11, 2011

(65) Prior Publication Data
US 2012/0010772 A1  Jan. 12, 2012

Related U.S. Application Data

(63) Continuation-in-part of application No. 12/100,782, filed on Apr. 10, 2008.

(60) Provisional application No. 61/333,541, filed on May 11, 2010.

(51) Int. Cl.
  *G01C 22/00* (2006.01)
  *G05D 1/00* (2006.01)
(52) U.S. Cl.
  USPC .................. 701/27; 701/23; 701/24; 701/25; 701/26; 700/245
(58) Field of Classification Search
  USPC ............ 701/23, 24, 25, 26, 27; 700/245, 246, 700/247, 248, 249, 250, 251, 252, 253, 254, 700/255; 318/587
  See application file for complete search history.

(56) References Cited

U.S. PATENT DOCUMENTS

| | | | |
|---|---|---|---|
| 6,879,878 B2 * | 4/2005 | Glenn et al. ................... | 700/245 |
| 7,034,694 B2 * | 4/2006 | Yamaguchi et al. ........ | 340/573.1 |
| 7,117,186 B2 * | 10/2006 | Koza et al. ....................... | 706/13 |
| 7,343,222 B2 * | 3/2008 | Solomon ........................ | 700/245 |
| 2004/0006424 A1 * | 1/2004 | Joyce et al. ...................... | 701/207 |
| 2004/0199289 A1 * | 10/2004 | Glenn et al. ................... | 700/245 |
| 2004/0243281 A1 * | 12/2004 | Fujita et al. .................... | 700/245 |
| 2007/0156255 A1 * | 7/2007 | Herrmann et al. .............. | 700/17 |
| 2007/0208442 A1 * | 9/2007 | Perrone ........................... | 700/95 |
| 2008/0059056 A1 * | 3/2008 | Chavira et al. ................ | 701/202 |
| 2010/0293220 A1 * | 11/2010 | Gennari et al. ............... | 709/202 |

* cited by examiner

*Primary Examiner* — Khoi Tran
*Assistant Examiner* — Rachid Bendidi
(74) *Attorney, Agent, or Firm* — Honigman Miller Schwartz and Cohn LLP

(57) ABSTRACT

A method of generating a command for a remote vehicle controller by taking in goals and constraints compiled from behavior inputs and action models, and controlling resources by producing low-level actuator commands that realize goals expressed by the behaviors. The method comprises: executing a command based on a kinodynamic fixed depth motion planning (KFDMP) algorithm to plan paths with longer time horizons and to use incremental feedback from evaluators to select a best feasible course of action; and feeding the selected best feasible course of action as servo commands to a drive system or a manipulation system of the remote vehicle controller. The selected best feasible course of action comprises goal-achieving actions within a fixed time horizon of several seconds from the current time each time a course of action is selected.

17 Claims, 33 Drawing Sheets

BEHAVIOR INVOCATION ARGUMENT & SHARED VARIABLE CONVENTIONS (1) onConfigure() → WRITES ARGUMENT DEFAULT VALUES TO Wm LOCATIONS
(2) ...ALSO WRITES ANY SHARED VARIABLE OUTPUTS TO DIFFERENT Wm LOCATIONS
(3) onStart() → READS ARGUMENT VALUES FROM Wm LOCATIONS
(4) onTHINK() → READS SHARED VARIABLES FROM Wm LOCATIONS
(5) ...ALSO UPDATES ANY OUTPUT SHARED VARIABLES TO Wm LOCATIONS LOCATIONS BUILT FROM NAMING CONVENTION BASED ON ASSEMBLAGE NAME
WHICH IS SET AS A PROPERTY BUILT INTO ALL BEHAVIORS THAT USE VARIABLES.

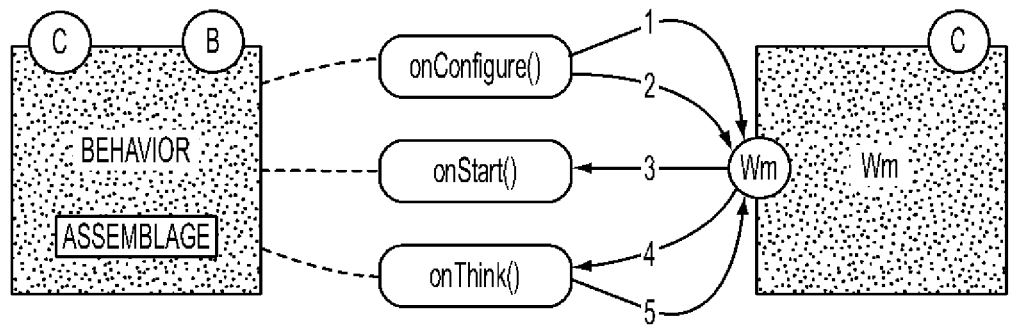

START ARGUMENTS: /Assemblage/StartArgs/<Argument Name>
RUNTIME VARIABLES: Assemlage/Var/<Variable Name>

FIG. 18

ADVANCED BEHAVIOR ENGINE

This is a continuation-in-part of U.S. patent application Ser. No. 12/100,782, filed Apr. 10, 2008. This patent application claims priority to U.S. Provisional Patent Application No. 61/333,541, filed May 11, 2010, titled Advanced Behavior Engine, the disclosure of which is incorporated herein by reference in its entirety.

INTRODUCTION

The present teachings relate to a behavior engine for use in, for example a remote vehicle system such as a robotic system.

BACKGROUND

Current trends in remote vehicle development include providing increased remote vehicle autonomy, which can require significant updates to behavior systems of remote vehicles.

Certain usage patterns of remote vehicle systems have evolved during the creation of complex remote vehicle behaviors. Existing remote vehicle behavior systems, such as the system described in U.S. patent application Ser. No. 12/100,782, filed Apr. 10, 2008, entitled Robotic Systems, can be based on a tree structure that does not separate the process of searching for actuator commands from the management of the "state machine" logic of the application. This can lead to a pattern of usage where certain "big behaviors" (e.g., a pose behavior or a waypoint behavior) are essentially statically configured as services and the big behaviors are invoked in a completely ad-hoc manner via behavior system events, leading to the possibility of scalability problems that are at least partly due to having a "hidden API". A "big behavior" can be defined as a part of the behavior system that actually participates in the action selection search, while other behaviors can be "managers" that "control" the handful of big behaviors by sending an ad-hoc event "language." Use of such big behaviors prevents clean separation of behavioral logic from implementation of action search processes. In addition, such big behaviors can make behavior writing more complex because the programmer has to deal with action selection search callbacks even if the programmer is really trying to implement application logic. As the behavior system grows, the need to know all of the separate "event languages" and "manager" relationships can make it prohibitively complex to continue to build upon existing behavior networks or reconfigure existing behavior networks dynamically to extend the functionality of a behavior system.

Further, a lack of good support for sequences, state machines, and other core logic as a part of a behavior system can mean that certain complex behaviors (e.g., stair climbing or self-righting) having many separate states and each stage must create its own "state machine logic" internally, resulting in either ad-hoc state machine systems or large and complex "monster behaviors" with very complex behavior-specific configurations. Lack of structure in a behavior system can limit growth of the system and successful extension of applications.

SUMMARY

The present teachings provide a method of generating a command for a remote vehicle controller by taking in goals and constraints compiled from behavior inputs and action models, and controlling resources by producing low-level actuator commands that realize goals expressed by the behaviors. The method comprises: executing a command based on a kinodynamic fixed depth motion planning (KFDMP) algorithm to plan paths with longer time horizons and to use incremental feedback from evaluators to select a best feasible course of action; and feeding the selected best feasible course of action as servo commands to a drive system or a manipulation system of the remote vehicle controller. The selected best feasible course of action comprises goal-achieving actions within a fixed time horizon of several seconds from the current time each time a course of action is selected.

The present teachings also provide a robotics system comprising: a behavior tree comprising a tree of behaviors for controlling remote vehicle resources, the behavior tree generating behavior goals; one or more action models that generate remote vehicle constraints; multiple remote vehicle resources; a control arbiter for each remote vehicle resource, the control arbiter controlling its associated remote vehicle resource; a remote vehicle controller in communication with the control arbiters; and one or more resource controllers in communication with the remote vehicle controller, the resource controllers receiving the behavior goals and the remote vehicle constraints and generating an overall command which is sent to the remote vehicle controller for execution on the remote vehicle resources.

Additional objects and advantages of the present teachings will be set forth in part in the description which follows, and in part will be obvious from the description, or may be learned by practice of the present teachings. The objects and advantages of the teachings will be realized and attained by means of the elements and combinations particularly pointed out in the appended claims.

It is to be understood that both the foregoing general description and the following detailed description are exemplary and explanatory only and are not restrictive of the present teachings, as claimed.

The accompanying drawings, which are incorporated in and constitute a part of this specification, illustrate embodiments of the present teachings and, together with the description, serve to explain the principles of the teachings.

BRIEF DESCRIPTION OF THE DRAWINGS

FIG. 18 schematically illustrates exemplary working memory variable conventions for use in a robotics system in accordance with the present teachings.

23A-23C illustrate an exemplary refinement of the KFDMP operation illustrated in FIGS. 22A-22E.

Figure 24:
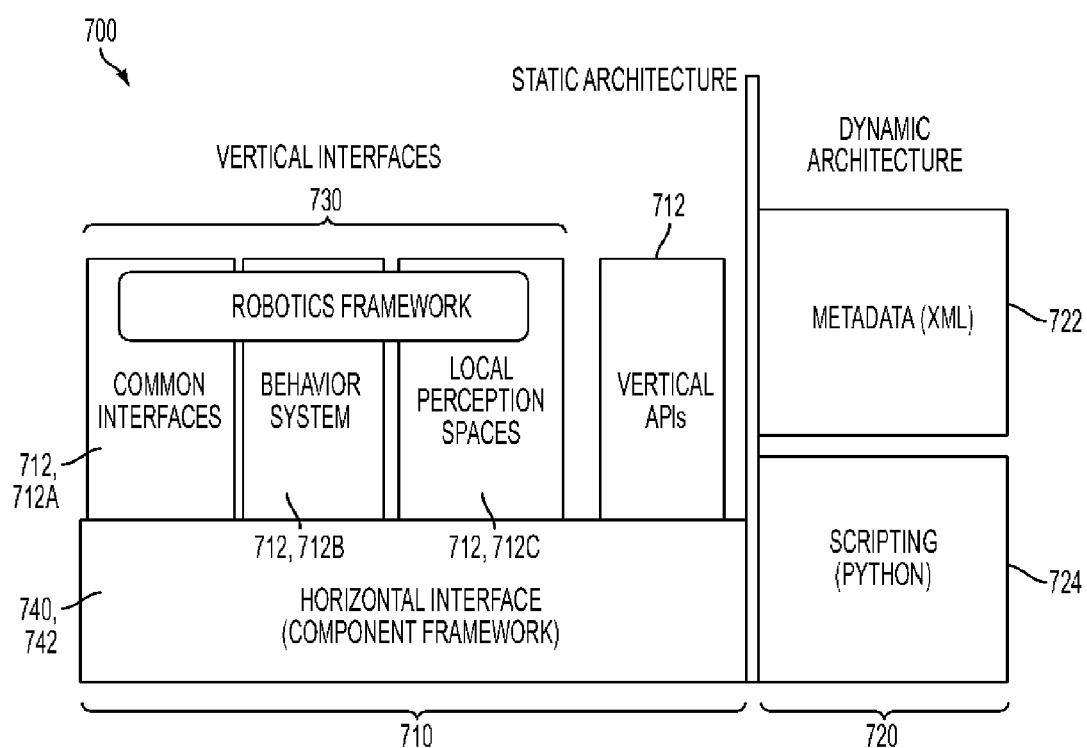

FIG. 24 schematically illustrates an exemplary embodiment of a robotics framework that can employ an advanced behavior engine in accordance with the present teachings.

Figure 25:
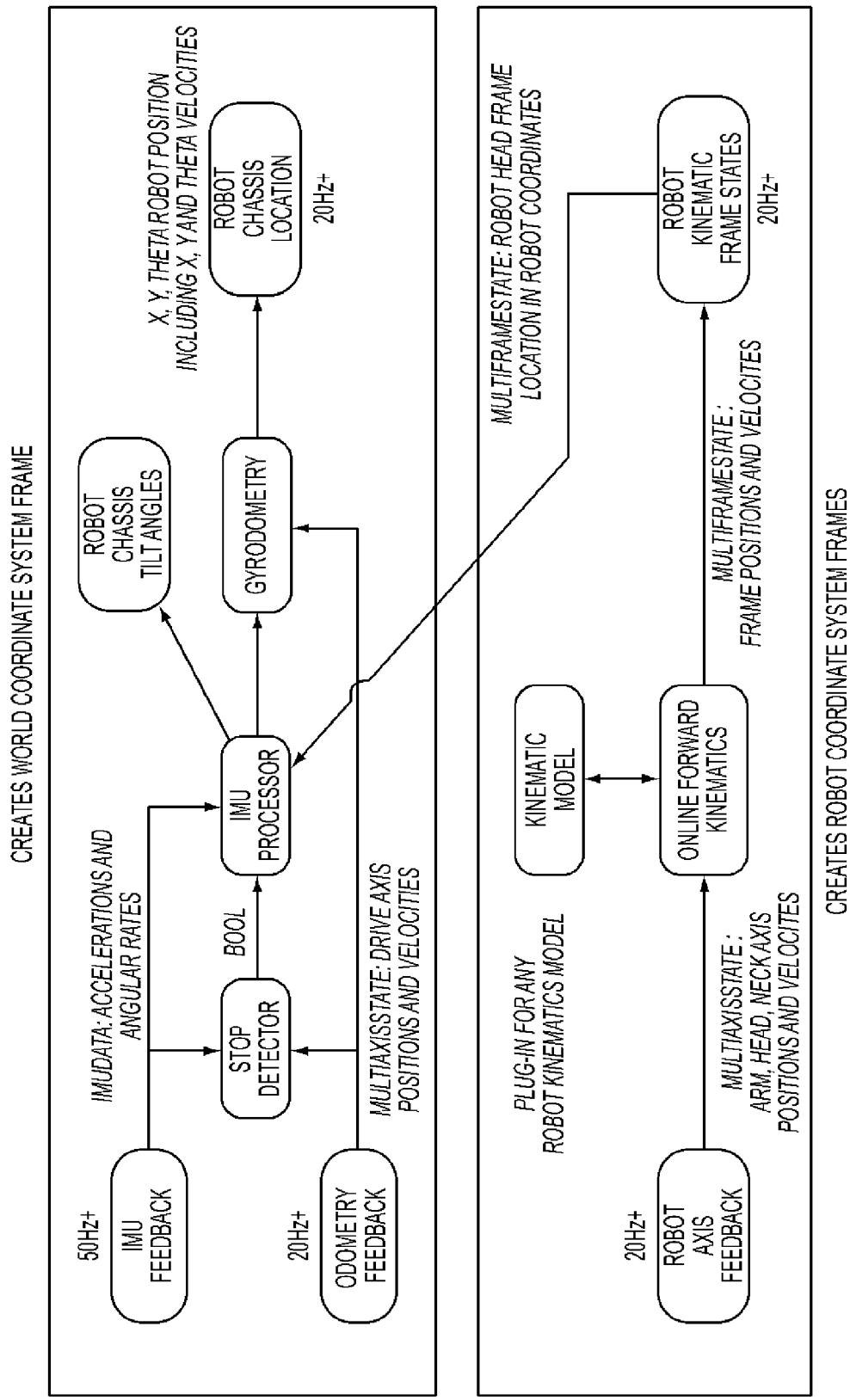

FIG. 25 is a schematic diagram showing input of sensor information that is used to determine a remote vehicle chassis location in world coordinates.

Figure 26:
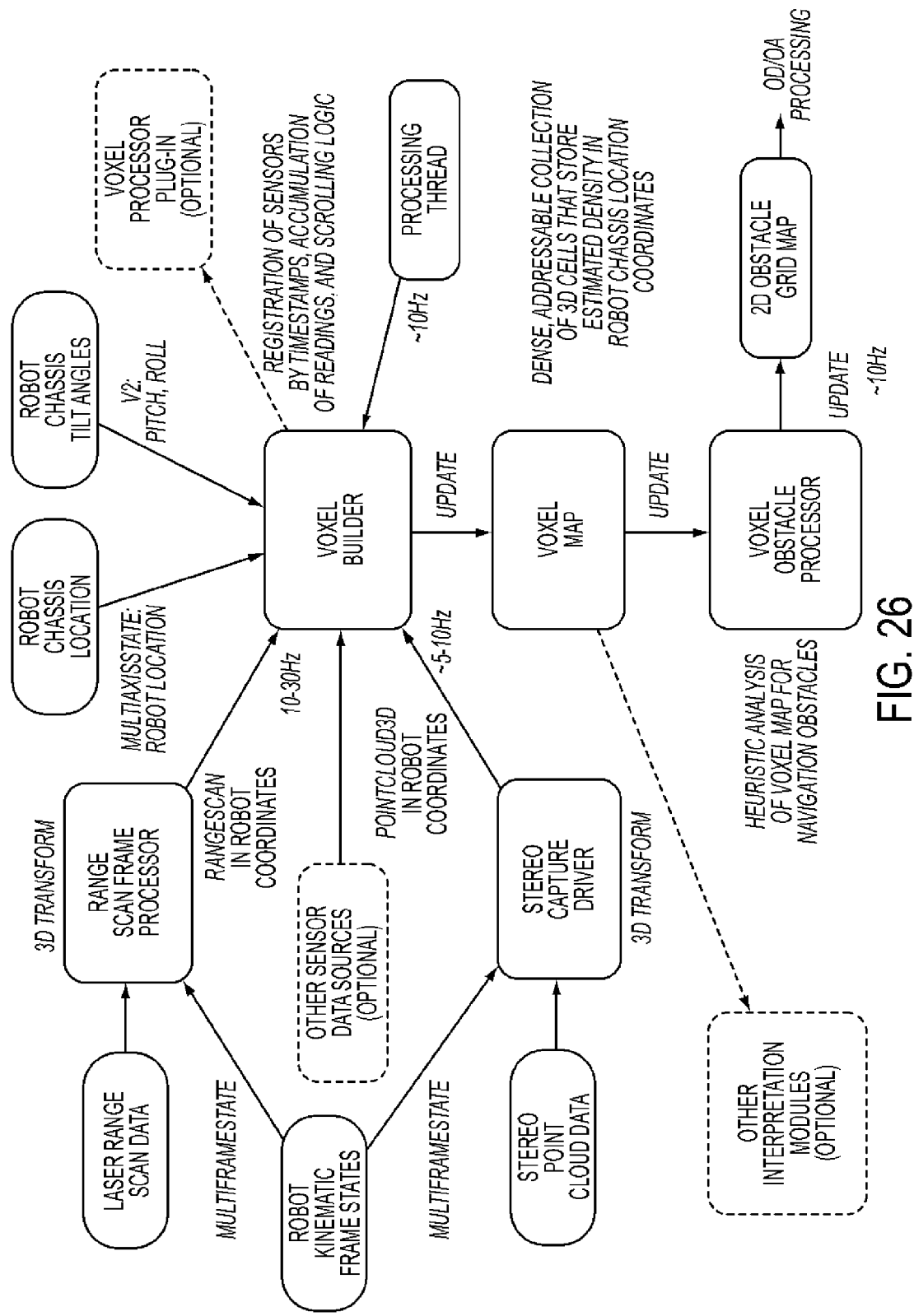

FIG. 26 is a schematic diagram showing how a voxel map can be built from a multitude of inputs in accordance with various embodiments of the present teachings.

Figure 27:
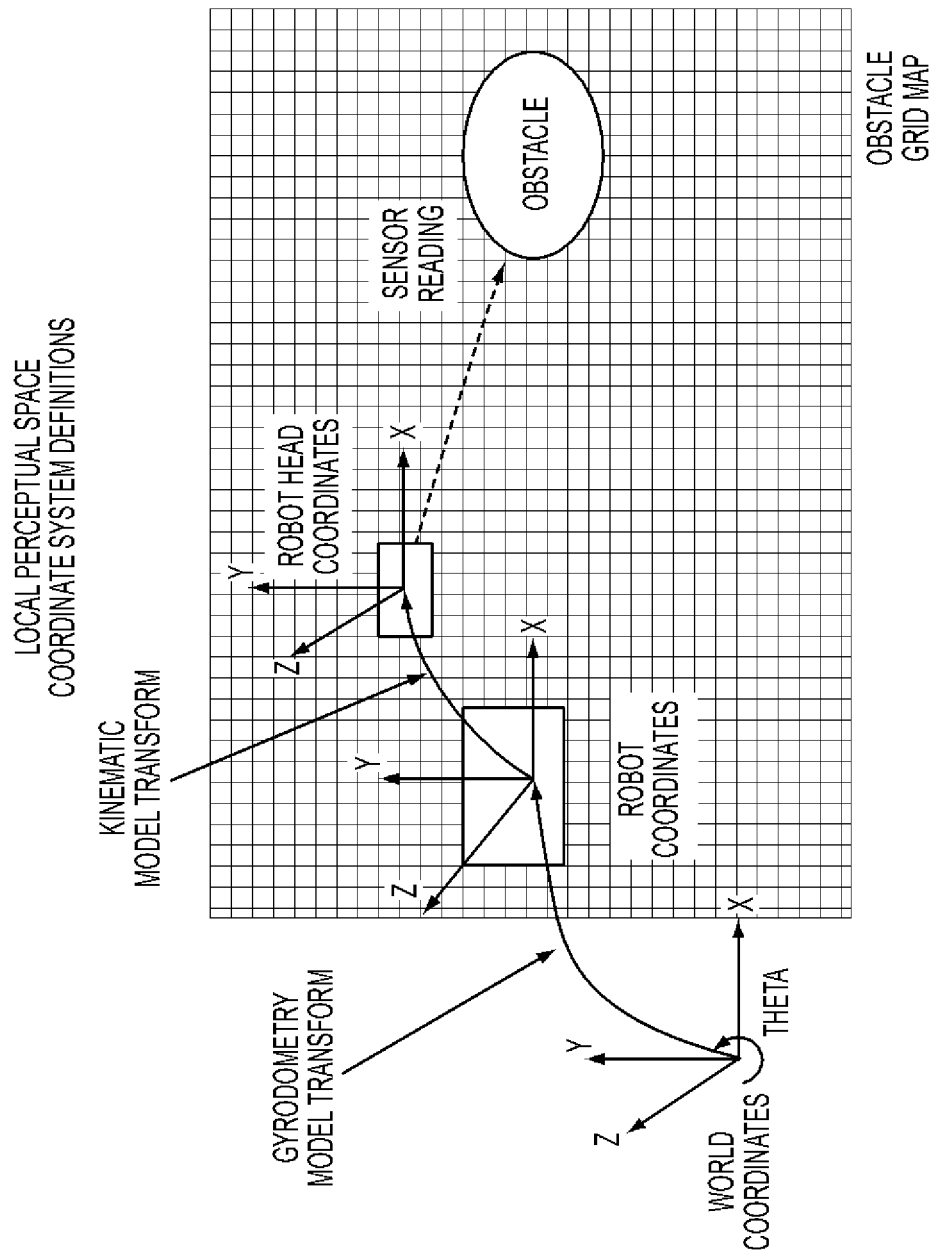

FIG. 27 defines coordinate systems used in 3D local perceptual space (LPS) and their relationships.

Figure 28:
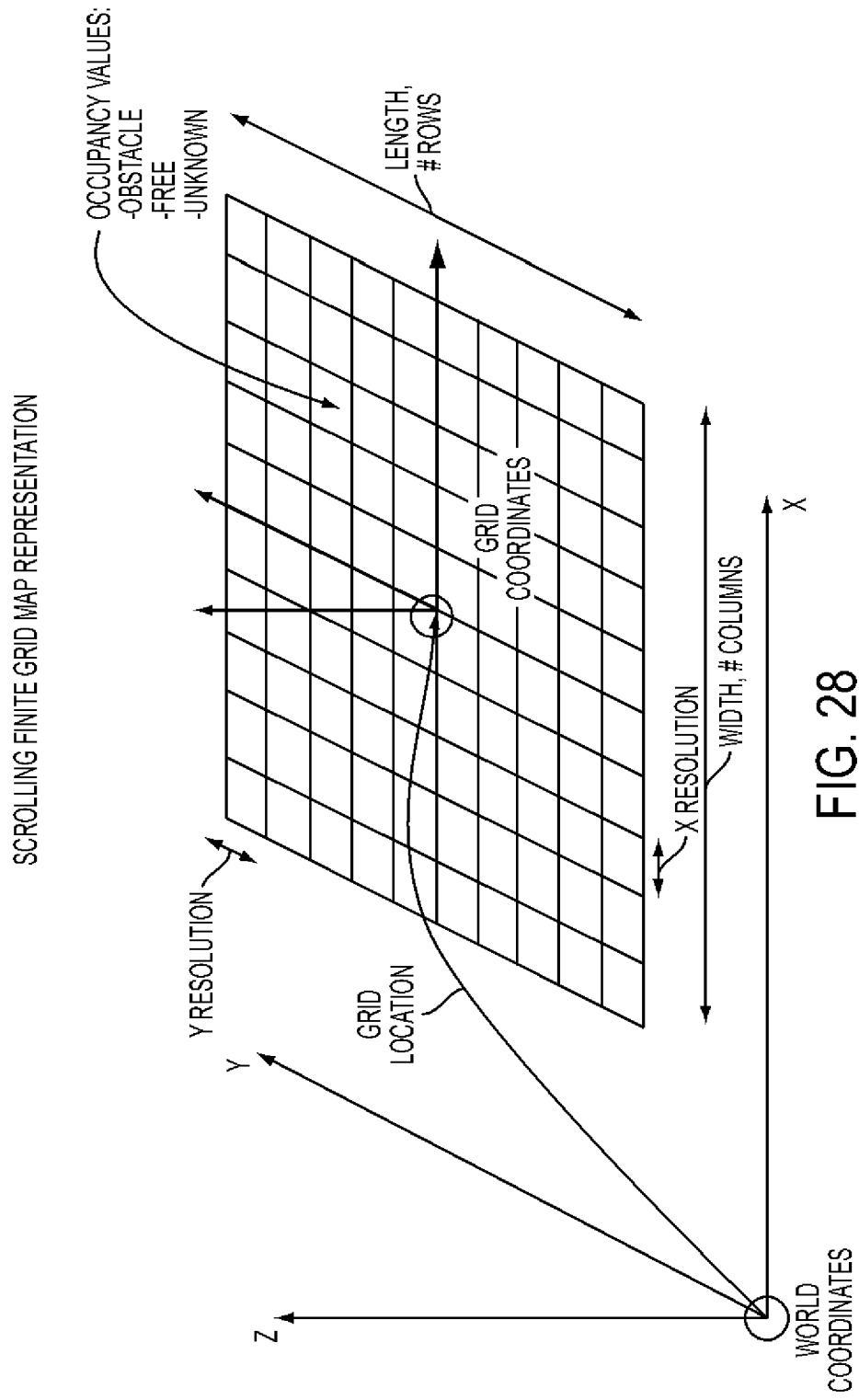

FIG. 28 schematically illustrates an exemplary embodiment of a scrolling finite grid map.

Figure 29:
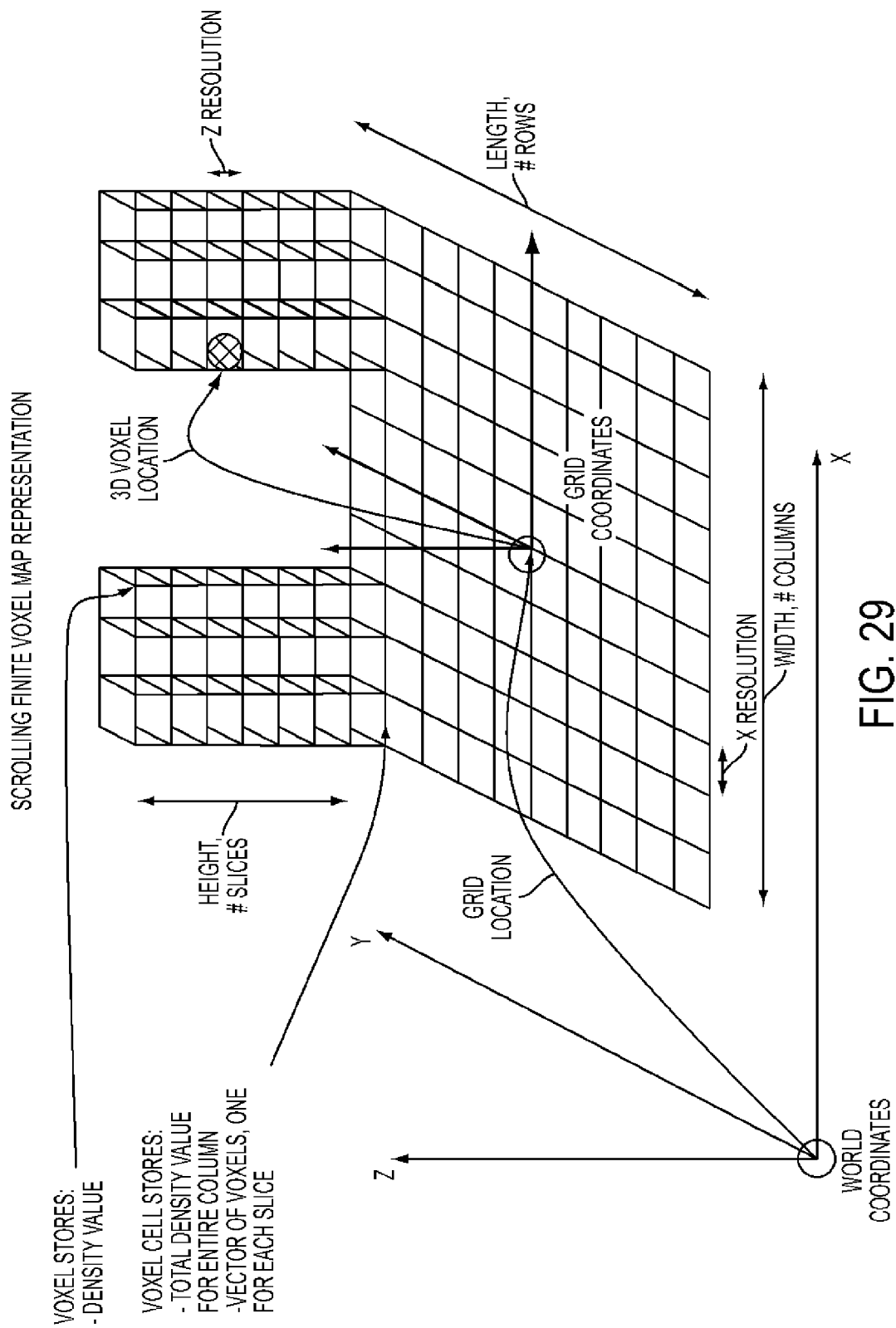

FIG. 29 illustrates an exemplary embodiment of a scrolling finite voxel map representation, adding a 3D voxel location to the grid of FIG. 28.

Figure 30A:
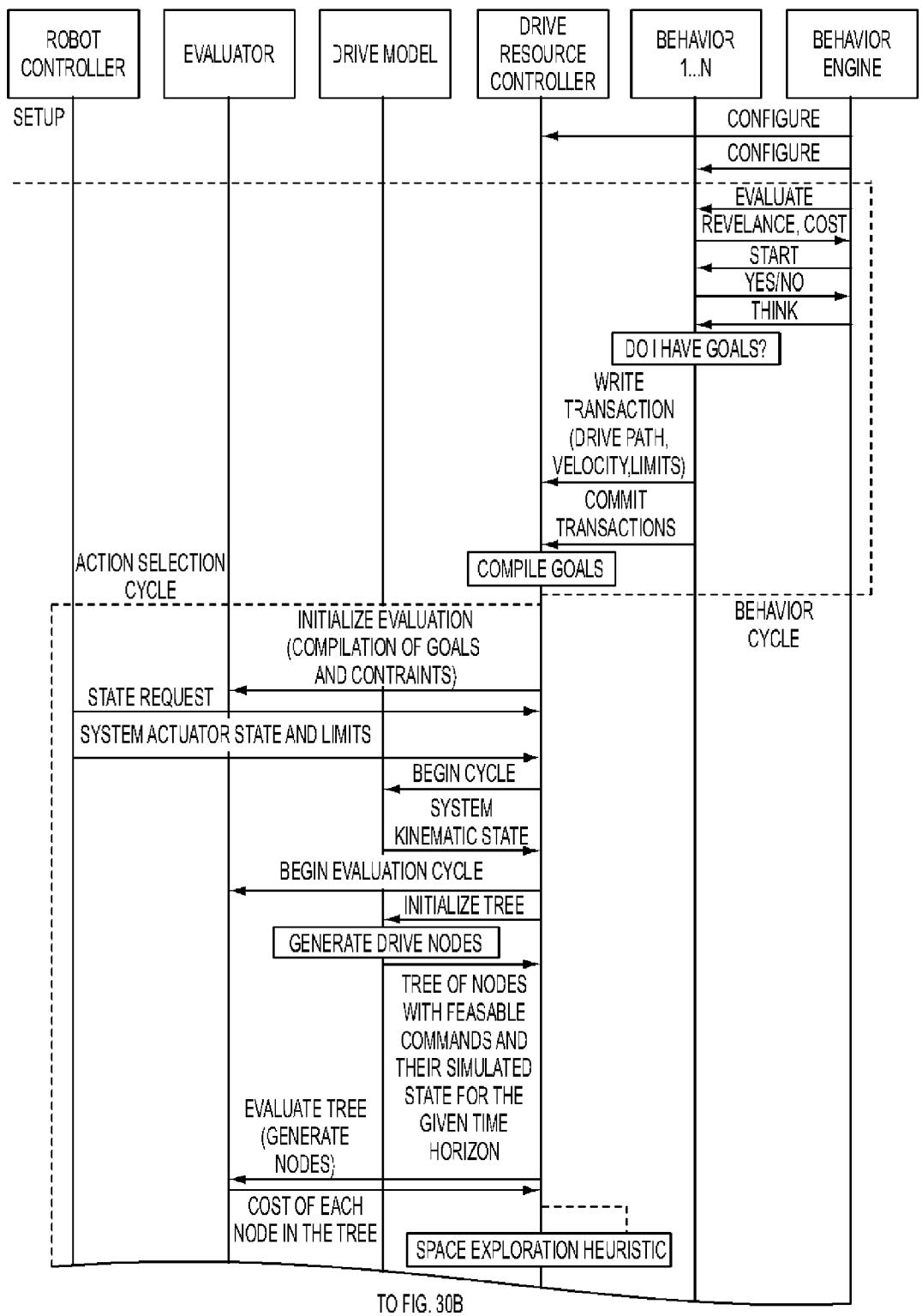
Figure 30B:
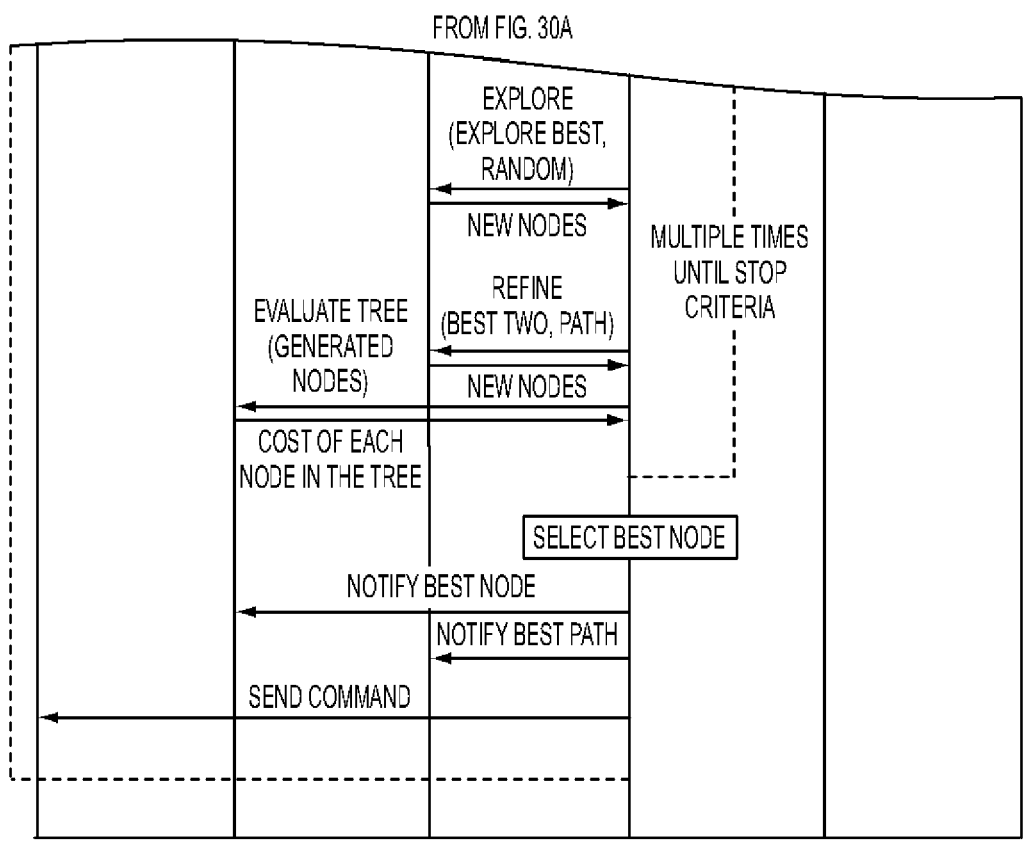

FIGS. 30A and 30B is a flow chart showing an exemplary embodiment of a command selection cycle for a robotics system in accordance with the present teachings.

DESCRIPTION

Reference will now be made in detail to embodiments of the present teachings, examples of which are illustrated in the accompanying drawings.

The present teachings provide a robotics system that allows separately written and independently deployed programs or applications to run concurrently on and to simultaneously control a remote vehicle (e.g., an autonomous remote vehicle). The independently deployed applications can be combined dynamically at runtime and need to be able to share resources of the remote vehicle. A low-level policy can be implemented for dynamically sharing the remote vehicle resources among the applications at run-time. Applications can start and stop dynamically and run completely independently of each other. The robotics system also allows for complex behaviors to be combined together to assist each other.

An advanced behavior engine in accordance with the present teachings can do one or more of support significantly more complex autonomous behaviors, improve overall remote vehicle performance, simplify the creation of behaviors, and provide better hooks for future automatic planning as a part of remote vehicle intelligence. The advanced behavior engine can, for example, plug into an existing remote vehicle behavior system such as, for example, an iRobot® Aware® 2 behavior system using an existing remote vehicle control interface, so that the advanced behavior engine can be compatible with the rest of the existing behavior system infrastructure, while providing a new foundation for creating highly capable remote vehicle intelligence.

While the robotic systems disclosed in U.S. patent application Ser. No. 12/100,782 could loosely be referred to as a "behavior tree," the game software industry has recently defined the term "behavior tree" to encompass a specific approach to the design of artificial intelligence (AI) systems, which can be similar to remote vehicle software environments. Game software industry behavior trees are soft real-time systems with many resource constraints, which need to provide highly-responsive, interactive software connected to complex models that work in a 3D environment.

Behavior trees in game software can refer to a specialized, structured form of hierarchical state machines where each state is responsible for fully encapsulating the states beneath it. The tree of states can encode the structural logic and high-level decision making of an in-game agent. The behavior tree can be called to decide what to do at each periodic update of the AI system. Each behavior in the tree has the same interface, allowing complex behaviors to be composed into hierarchies.

Behavior trees can be useful for integration with graphical editing tools that allow developers to graphically build behavior trees from collections of "building block" behavior implementations. The intrinsically graphical nature of behavior trees can be useful, for example, for communication of the internal design of a particular remote vehicle feature in a larger group including user experience designers and other development team members.

In generally, a behavior tree can comprise a simple callback interface the periodically provides CPU time for a behavior to perform its specific function. The callback can return one of a fixed set of return codes each time it is called. Composite behaviors can provide implementations and policies for calling child behaviors in specific ways to sequence the child behaviors, select the child behaviors, or run the child behaviors in parallel. The callback structure is a form of cooperative multi-tasking that allows lightweight concurrency to be implemented easily and cleanly.

Figure 1:
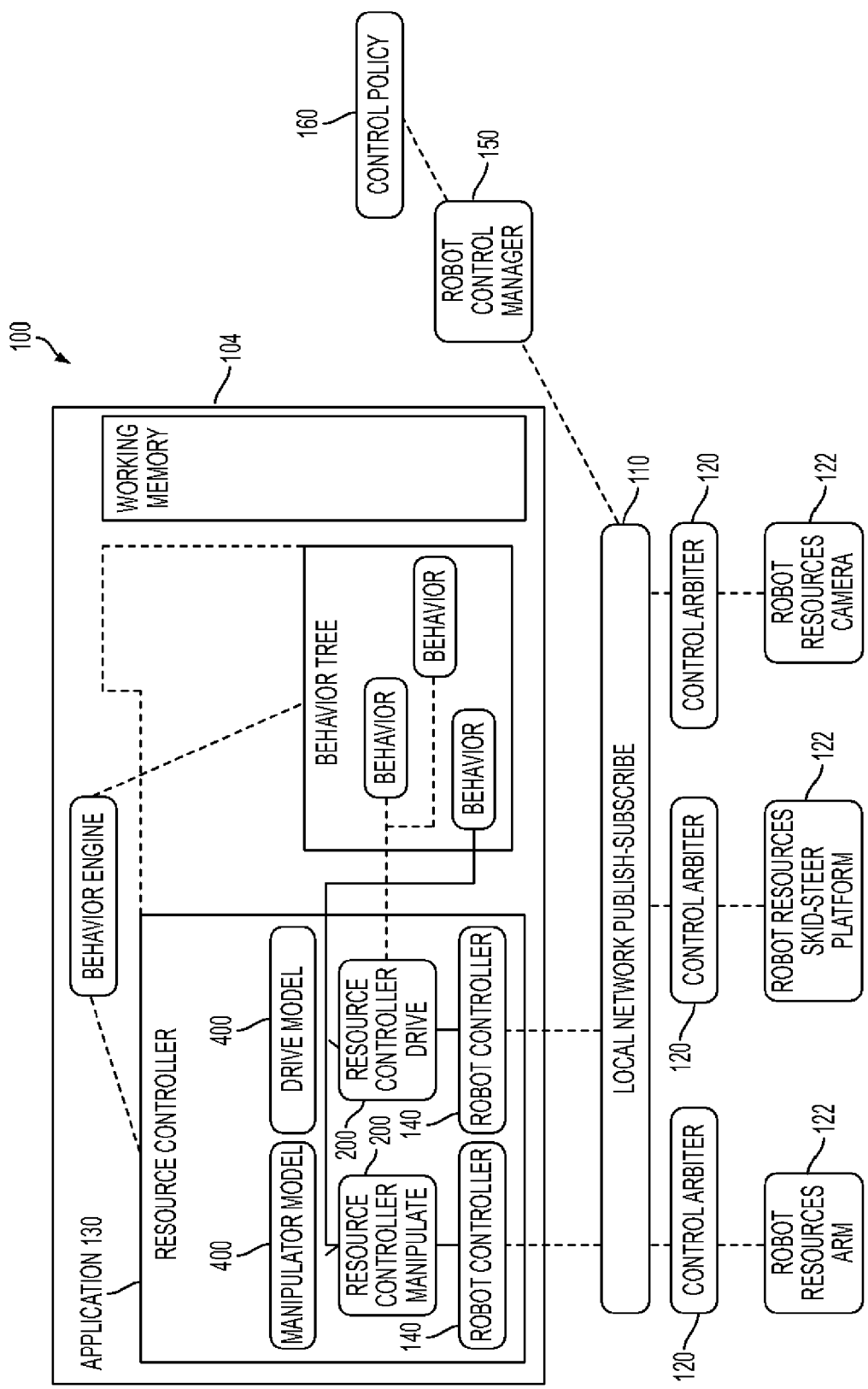
FIG. 1 is a schematic diagram of an exemplary embodiment of a robotics system in accordance with the present teachings.

Referring to FIG. 1, a robotics system 100 includes a control arbitration system 102 and a behavior system 104 in communication with each other. The control arbitration system 102 allows applications to be dynamically added and removed from the robotics system 100, and facilitates allowing applications to each control the remote vehicle without needing to know about any other applications. In other words, the control arbitration system 102 provides a simple prioritized control mechanism between applications and the resources 122 of the robotics system 100. The control arbitration system 102 can comprise one or more remote vehicle controllers 140, a remote vehicle manager 150, and one or more control arbiters 120. These components do not need to be in a common process or computer, and do not need to be started in any particular order. This capability allows for different modules (e.g. payloads) with self contained computing power to be plugged into the robotics systems 100, and provides the ability to plug in a small piece of remote vehicle brain providing different capabilities to the overall robotics system 100, while using the same actuator space.

The remote vehicle controller 140 can provide an interface to the control arbitration system 102 for the applications. The remote vehicle controller 140 can abstract and encapsulate away the complexities of authentication, distributed resource control arbiters, command buffering, and the like.

The remote vehicle manager 150 coordinates prioritization of applications and behaviors by controlling which application r behavior has exclusive control of any of the remote vehicle resources 122 at any particular time. Since the remote vehicle manager 150 can be the central coordinator of information, there need only be one instance of the remote vehicle manager 150 per remote vehicle. The remote vehicle manager 150 can keep track of the resource control arbiters 120 that provide hardware control.

One or more control arbiters 120 receive commands from every application or behavior and generate a single command based on the applications' priorities and publishes it for its associated resources 122. The control arbiter 120 also receives state feedback from its associated resources 122 and sends it back up to the applications or behaviors. Remote vehicle resources 122 may be a network of functional modules (e.g. actuators, drive systems, and groups thereof) with one or more hardware controllers. Each resource 122 has a control arbiter 120 that issues commands to that resource 122. The remote vehicle resources 122 are preferably pluggable and may be dynamically added or removed from the robotics system 100 and its network 110 at run-time. The commands of the control arbiter 120 are specific to its resource 122 to carry out specific actions.

Still referring to FIG. 1, the robotics system 100 for a remote vehicle (not shown) can include a network 110 that provides intra-process communication for the control arbitration system 102 via a real-time publish/subscribe system. Publish/subscribe (or pub/sub) is an asynchronous messaging paradigm where senders (publishers) of messages are not programmed to send their messages to specific receivers (subscribers). Rather, published messages are characterized into classes, without knowledge of what (if any) subscribers there may be. Subscribers express interest in one or more classes, and only receive messages that are of interest, without knowledge of what (if any) publishers there are. This decoupling of publishers and subscribers can allow for greater scalability and a more dynamic network topology. A publication provides a mechanism for updating a specific data item in a distributed database, so that the value will be propagated to all interested parties (the "subscribers") without the publication client having any knowledge of subscribers. A subscription provides a mechanism for accessing a specific data item from a distributed database, without knowledge of the exact source of that data item (the "publisher"). For example, behaviors of the behavior tree can collect sensor information published to the publish/subscribe system on the local network 110. In another example, the remote vehicle controllers 140 can publish commands 440 to shared memory of the pub/sub system on the local network 110 that is accessed by control arbiters 120 to pull the commands 440 in any particular order. A more detailed explanation for another behavior system can be found in priority U.S. patent application Ser. No. 12/100,782, filed Apr. 10, 2008, the contents of which are incorporated herein by reference in their entirety.

In an exemplary control arbitration process for an advanced behavior engine in accordance with the present teachings, a remote vehicle manager 150 can provide a remote vehicle manager configuration 152 stored in shared memory (e.g., the pub/sub system) of the local network 110 that implements the control policy 160. The remote vehicle manager configuration 152 can store a remote vehicle controller list 154 of all the remote vehicle controllers 140 (e.g., by name) and a control arbiter list 156 of all the control arbiters 120 (e.g., by name) available within the robotics system 100. The remote vehicle controller list 154 and the control arbiter list 156 may be defined by a user or automatically by a system process to provide a linear prioritization of the remote vehicle controllers 140 and the arbiters 120. Every remote vehicle controller 140 itemized in the remote vehicle controller list 154 can have a corresponding remote vehicle controller memory block 142 in the shared memory of the local network 110. Similarly, every control arbiter 120 itemized in the control arbiter list 156 can have a corresponding control arbiter memory block 124 in the shared memory of the local network 110. The remote vehicle controllers 140 can communicate with the remote vehicle manager configuration 152 to learn of all the control arbiters 120 available to receive commands in the robotics system 100 by getting the control arbiter list 156. Each remote vehicle controller 140 publishes a command 440 and a status 144 to its corresponding remote vehicle controller memory block 142. Publication of the command 440 and status 144 can cause a change in the state of the shared memory via the publish/subscribe system. Each control arbiter 120 wakes up in response to the shared memory change.

Each control arbiter 120 can communicate with the remote vehicle manager configuration 152 to learn of all the remote vehicle controllers 140 in the robotics system 100, and can pull the commands 440 and statuses 144 from all of the remote vehicle controller memory blocks 142. Each control arbiter 120 sequentially pulls a command 440 and status 144 from each remote vehicle controller memory block 142 in an order defined by the remote vehicle controller list 154, and, depending on the remote vehicle controller status 144, issues the command 440 to one or more of the uncommitted connected resources (e.g., hardware) of that control arbiter 120. Each remote vehicle controller 140 can have a status 144 of compromising or non-compromising. With a status 144 of compromising, for example, the remote vehicle controller 140 is willing to allow issuance of a partial command 440. In contrast, with a status 144 of non-compromising, for example, the remote vehicle controller 140 will only allow issuance of a full command 440.

Figure 2:
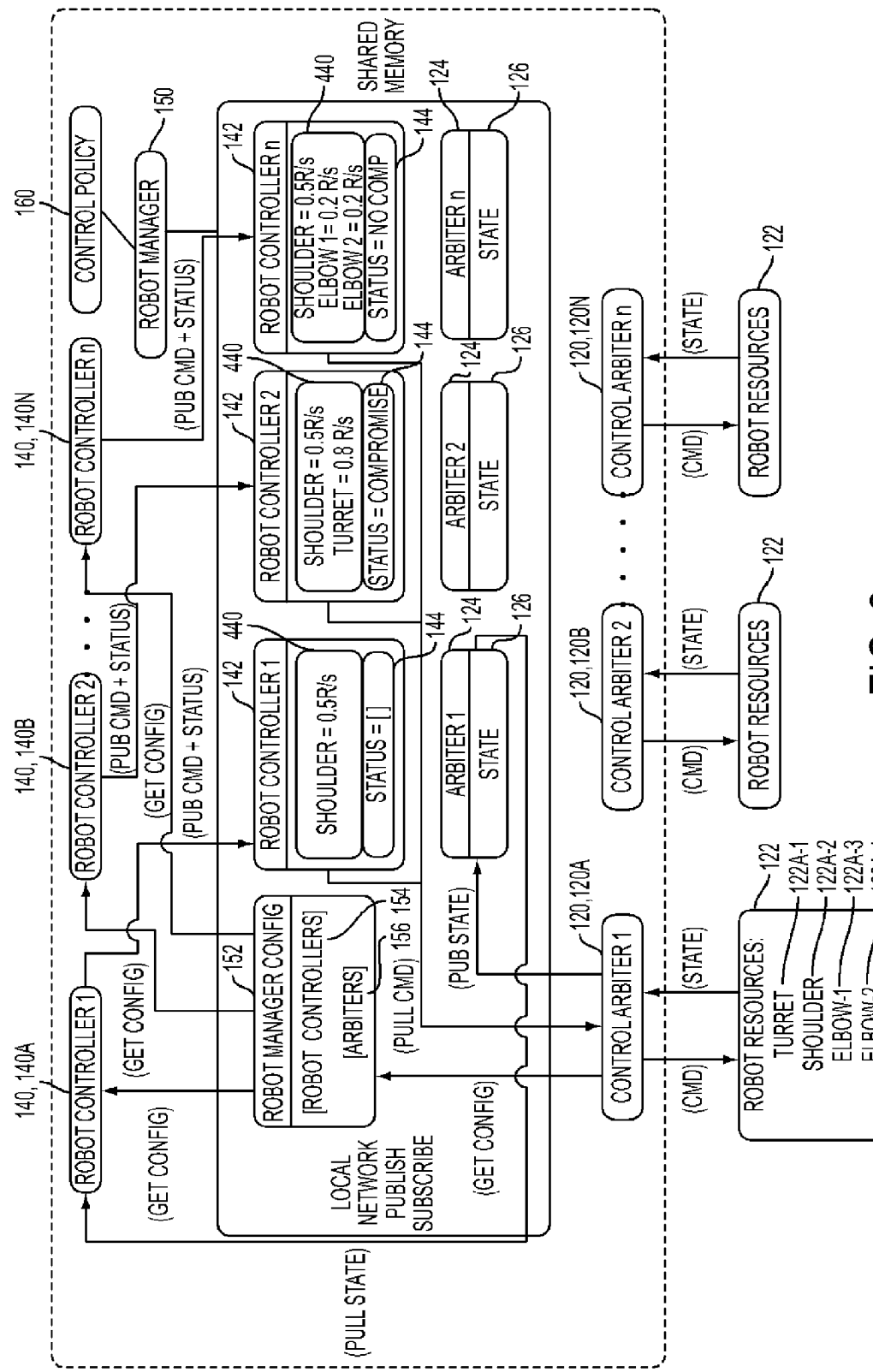
FIG. 2 is a schematic diagram of an exemplary embodiment of a control arbitration system of a robotic system in accordance with the present teachings.

For example, referring to FIG. 2, the first control arbiter 120A controls an arm resource 122 having a turret, a shoulder, an elbow-1, and an elbow-2. The remote vehicle controllers 140 become informed of the first control arbiter 120A through the nth control arbiter 120N by getting the control arbiter list 156 from the remote vehicle manager configuration 152. Each active remote vehicle controller 140 receives a command 440 from the behavior system 102 for execution by the control arbitration system 102 and publishes its command 440 in a respective remote vehicle controller memory block 142. The control arbiters 120 recognize that one or more commands 440 have been published and sequentially pull the commands 440 for execution. The first control arbiter 120A (as designated so by the control arbiter list 156) pulls the command 440 and status 144 of the first remote vehicle controller 140A (as designated so by the remote vehicle controller list 154) from the respective remote vehicle controller memory block 142, which, in this case, contains a command 440 for the shoulder resource 122A-2. The status 144 of the first remote vehicle controller 140A is irrelevant because none of the resources 120 have been committed yet. The first control arbiter 120A commits the shoulder resource 122A-2 to the command 440 of the first remote vehicle controller 140A.

Next, the first control arbiter 120A pulls the command 440 and status 144 of the second remote vehicle controller 140B from the respective remote vehicle controller memory block 142, which, in this case, contains a command 440 for the shoulder resource 122A-2 and the turret resource 122A-1 and a status of compromising. Since the shoulder resource 122A-2 was committed to the first remote vehicle controller 140A, the first control arbiter 120A will be unable to issue the full command 440 of the second remote vehicle controller 140B. Nevertheless, since the second remote vehicle controller 140B has a status of compromising, the first control arbiter 120A will be able to issue the command 440 partially, by committing the currently uncommitted turret resource 122A-1 for the command 440 of the second remote vehicle controller 140B. The first control arbiter 120A proceeds to sequentially pull the command 440 and status 144 of each successive remote vehicle controller 140 in the remote vehicle controller list 154 and commit resources 122 in accordance with the status 144 of the respective remote vehicle controller 140.

In the example of nth remote vehicle controller 140N, the first control arbiter 120A pulls its command 440 and status 144 from the respective remote vehicle controller memory block 142, which, in this case, contains a command 440 for the shoulder resource 122A-2, the elbow-1 resource 122A-3, and the elbow-2 resource 122A-4, and a status of non-compromising. Since the shoulder resource 122A-2 was committed to the first remote vehicle controller 140A, the first control arbiter 120A will be unable to issue the full command 440 of the nth remote vehicle controller 140N. Furthermore, since the nth remote vehicle controller 140N has a status of non-compromising, the first control arbiter 120A will be unable to issue the command 440 partially to the uncommitted elbow-1 and elbow-2 resources 122A-3, 122A-4. As a result, the first control arbiter 120A commits no resources 122 for the command 440 from the nth remote vehicle controller 140N. The command 440 from the nth remote vehicle controller 140N will unit for another cycle when all of the required resources 122 are uncommitted and available.

The first control arbiter 120A continues to step through each remote vehicle controller 140 until all of its connected resources 122 are committed. Once all of the connected resources 122 are committed, the control arbiter 120 sends a coherent command to its resources 122 and updates its corresponding control arbiter memory block 124 with state feedback 126 of the resources 122. Each remote vehicle controller 140 can pull the state feedback 126 (e.g., asynchronously) of each control arbiter 120 from the corresponding control arbiter memory block 124.

Figure 3:
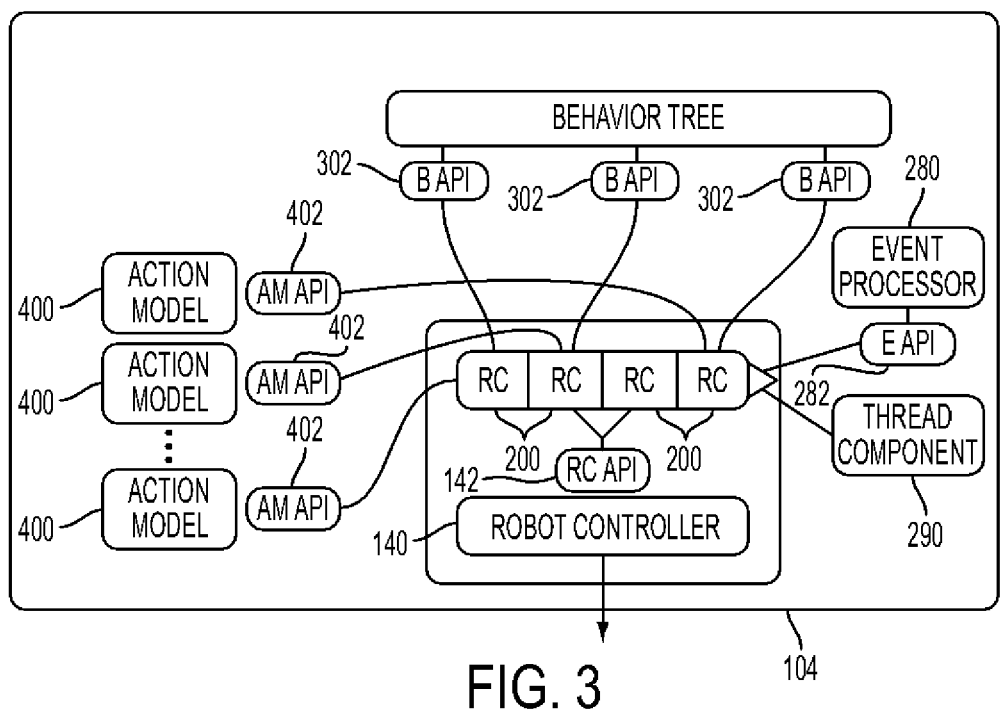
FIG. 3 is a schematic diagram of an exemplary embodiment of a behavior system of a robotics system in accordance with the present teachings.
Figure 4:
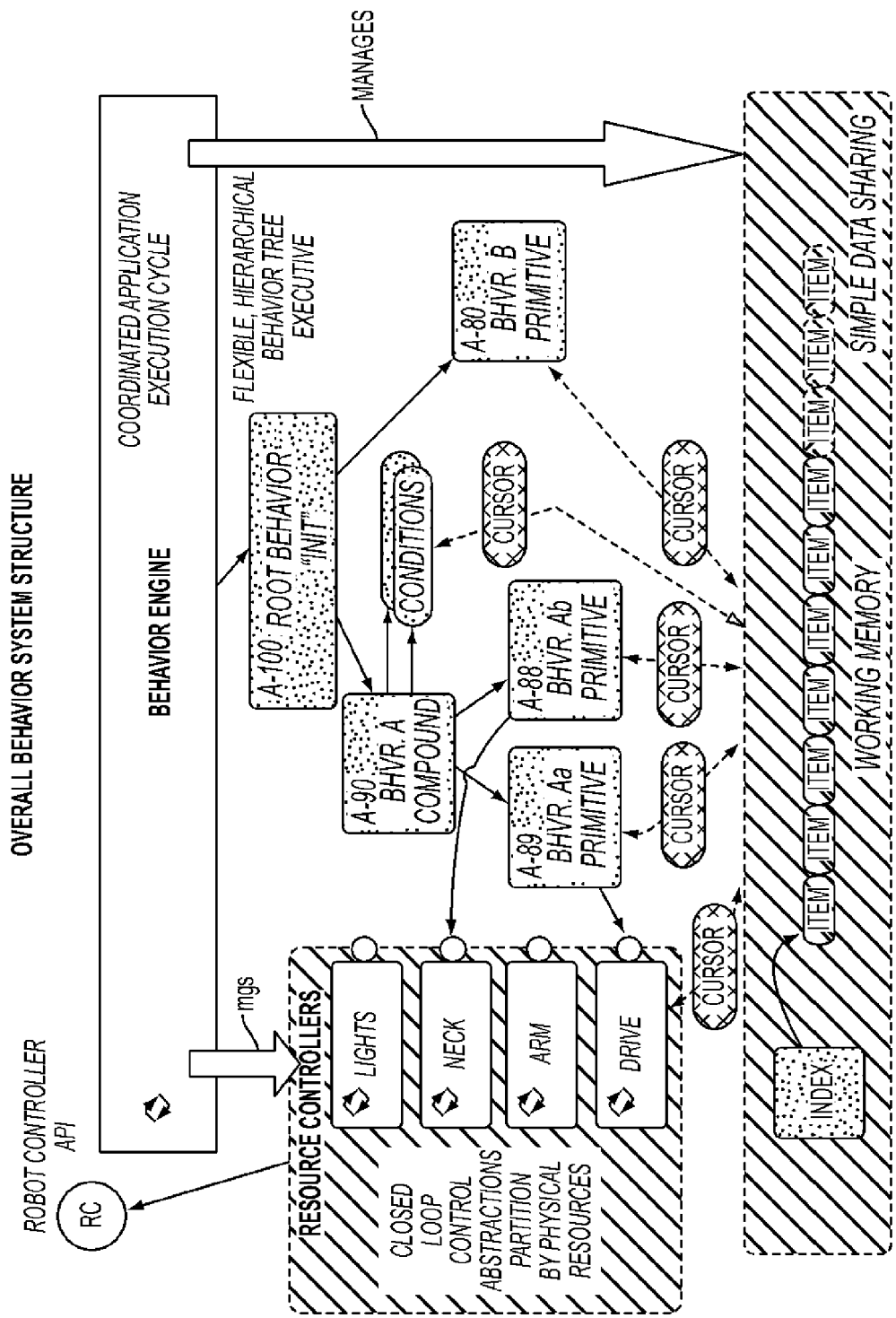
FIG. 4 is a schematic diagram of an exemplary embodiment of an overall behavior system structure, including concurrently-running resource controllers.

Referring to FIGS. 1 and 3, the behavior system 104 includes a behavior tree including pluggable behaviors that interface with a number of parallel-running resource controllers 200 (e.g., drive resource controllers and/or manipulator resource controllers as described in more detail below), a remote vehicle controller 140, and one or more action models 400 connected to the resource controllers 200. Concurrently-running resource controllers are illustrated in more detail in FIG. 4. The behavior system 104 can provide predictive modeling and allow behaviors in the behavior tree to collaboratively decide on the remote vehicle's actions by evaluating possible outcomes, which will be described later. A behavior can be a plug-in component that provides an evaluation function that can be based on an internal state machine, a coupling of sensory feedback from multiple sources to outcomes 450, or a combination of the evaluation functions of other behaviors in a subsequent layer. This allows behaviors to nest hierarchically (as illustrated in FIG. 4) and form a layered hierarchical and state evaluation function that maps sensory feedback to outcomes 450 differently in different situations. Since the behaviors can be plugged into the robotics system 100, they can be removed and added without having to modify the robotics system 100.

The resource controllers 200 can communicate with the remote vehicle controller 140 through one or more remote vehicle controller application programming interfaces (API) 142 (see FIG. 3), the behavior tree can communicate with the remote vehicle controller 140 through behavior APIs 302 and resource controllers 200, and action models 400 can communicate with the remote vehicle controller 140 through action model APIs 402 and resource controllers 200. Abstraction and encapsulation of each component can be accomplished through their respective APIs 142, 302, 402, which provides a manner in which the components communicate with the resource controllers 200.

An example interface for a behavior API 302 is set forth in priority U.S. patent application Ser. No. 12/100,782, filed Apr. 10, 2008, the contents of which are incorporated herein by reference in their entirety.

Each behavior is intended to implement a separable portion of the overall cognizance of the remote vehicle (e.g., goto waypoint or avoid collision). To support coordination of the behaviors, a behavior event interface provides commands through working memory (e.g., stop, start, pause, timeout). An action model API 402 allows various action models 400 to communicate configuration setup including names of resources, states, and a number of actions generated for each cycle of the resource controllers 200. The present teachings also contemplate providing an event processor component 280 and an event handler as described in more detail below. Action models 400 can be event handlers as well, and can coordinate as necessary with any of the event stream information in the behavior system 104. Example interfaces for an action model API 402, an event processor component 280, and an event handler API are set forth in priority U.S. patent application Ser. No. 12/100,782, filed Apr. 10, 2008, the contents of which are incorporated herein by reference in their entirety.

In various embodiments of the present teachings, an event processor 280 can be provided and accessed by the resource controllers 200, as illustrated in FIG. 3. The event processor 280 can have a queue of events that builds up as the event processor 280 receives events, and a thread that periodically sends the events out. This makes it possible for behaviors of the behavior tree to post a new event while handling an existing event. The event processor 280 can provide de-multiplexed forwarding of event objects to a collection of event handler objects.

In certain embodiments of the present teachings, one or more thread components 290 can be provided to and accessed by the resource controllers 200. In certain embodiments of the present teachings, the advanced behavior engine runs each resource controller on a separate thread (not illustrated) and the logic on its own separate thread (also not illustrated), providing increased concurrency in the design. The thread components 290 can contain a thread to run it, allowing other components to be hooked up and run at the same rate. The thread components 290 can have a periodic thread to trigger action interfaces. Typically, the behavior system 104 is run at 10 Hz or more and the time horizon explored by the system should extend many cycles (often seconds) into the future.

The present teachings provide a new structure for intelligence in remote vehicle behavior systems, and can be based around one or more of several core elements: (1) a behavior engine that coordinates the operation of the application, handling proper sequencing, locking, and handshaking operations, such that writing and creating groups of behaviors is simplified; (2) a tree of behaviors that is given callbacks to perform the work of the application and is notified of external state changes—the behaviors form a concurrent, hierarchical finite state machine comprising modular components; (3) a behavior engine that provides coordinated access to a shared working memory allowing behaviors to easily and safely share arbitrary data types indexed by arbitrary names; (4) a working memory that supports a copy on write access pattern that is efficient for multiple readers and offers a cursor object so that the cost of repeated item lookup is eliminated; (5) a behavior engine that coordinates one or more resource controllers providing procedural interfaces for controlling various remote vehicle resources; (6) behaviors that can locate one or more resource controllers dynamically by looking for different resource controllers in working memory, with the set of resource controllers varying based on physical remote vehicle configuration; and (7) one or more resource controllers that use an existing remote vehicle control API to provide commands and get actuator state feedback from a low-level system such as, for example, the remote vehicle's existing behavior system.

FIG. 4 is a schematic diagram of an advanced behavior engine in accordance with certain embodiments of the present teachings, and makes up a portion of the robotics system 100 illustrated in FIG. 1. In the illustrated embodiment, a tree of behaviors provides the heart of the application intelligence and logic. Behaviors are composable, reusable components that implement the core behavior interface and protocol. System functionality can be divided into "blocks," and new blocks can be added to enhance functionality in a simplified manner. A behavior interface provides a small collection of callbacks that must be implemented. The behavior engine can call the behavior interface to implement the logic of the behavior tree. A behavior tree as described herein for use in an advanced behavior engine in accordance with the present teachings can separate system logic from kinodynamic motion planning to allow plug and play addition of behaviors and system features. The behavior interface can comprise, for example, a group of 6 methods:

configure( )—Called to allow behaviors to configure themselves based on the contents of working memory, locate resources, and cache cursors for faster lookup later, etc.

evaluate( )—Called by some container behaviors to allow delegation of situation assessment to child behaviors. Child behaviors can determine whether they are relevant given a current situation.

getStatus( )—Behaviors have a well-defined status and this returns the immediate behavior status.

Start( )—Start performing this behavior. This callback allows a behavior to initialize internal variables, reset counters, and prepare to be executed in control of the remote vehicle. It also marks the starting point for any timeouts of the behavior. An optional argument can allow the behavior to be resumed if it was paused. In addition, behaviors may update cursors in start as necessary.

Stop( )—Stop performing this behavior. This callback allows a behavior to "clean up" when it is stopped by a controlling behavior above it. An optional argument allows the behavior to be paused so it can be later resumed.

Think( )—This function is called periodically after the behavior is started and is where the "main work" of a behavior resides. The behavior uses this call to perform its function and update any internal or external state and write commands to any resource controllers it wants to use. The think( ) function then returns its status to the calling behavior.

In accordance with certain embodiments of the present teachings, a handful of additional or utility methods can be added to the behavior interface as the design matures, but the functions defined above can comprise the core behavior interface that makes the framework function. A behavior can also be a canonical collection of states, and well-defined state transitions are a part of the behavior interface protocol. All behaviors are built around the following core state machine that can handle common functional and error cases in robotics in a general way. In accordance with embodiments of the present teachings, a state machine for behaviors includes the following states.

UNKNOWN—This is the state once a behavior component has been setUsable, but has not yet had configure( ) called on it.

OFF—This is the state once a behavior is configured but inactive, and a stopped behavior enters this state if it is exited by the stop( ) call externally.

IN_PROGRESS—This is the state once a behavior has started (returned true from its start( ) call) and is running, thinking, and sending commands and/or an updating state. A behavior continues running again on the next cycle by returning IN_PROGRESS from its think( ) call.

SUCCEEDED—This is the state once a behavior has determined that it has succeeded in doing whatever it was doing and is done until started again. A behavior may return SUCCEEDED from a think( ) call.

FAILED—This is the state once a behavior has determined that it has failed at doing whatever it was doing and is done until started again. A behavior may return FAILED from a think( ) call.

TIMEOUT—This is the state once a behavior has determined that it has exceeded its allotted time for doing its work and is done until started again. A behavior may return TIMEOUT from it's think( ) call.

PAUSED—This is the state for a behavior that is exited by the stop( ) call externally when the optional pause argument is given, allowing the behavior to resume its execution later when started with the optional resume argument given. A behavior may return PAUSED from a think( ) call.

Figure 5:
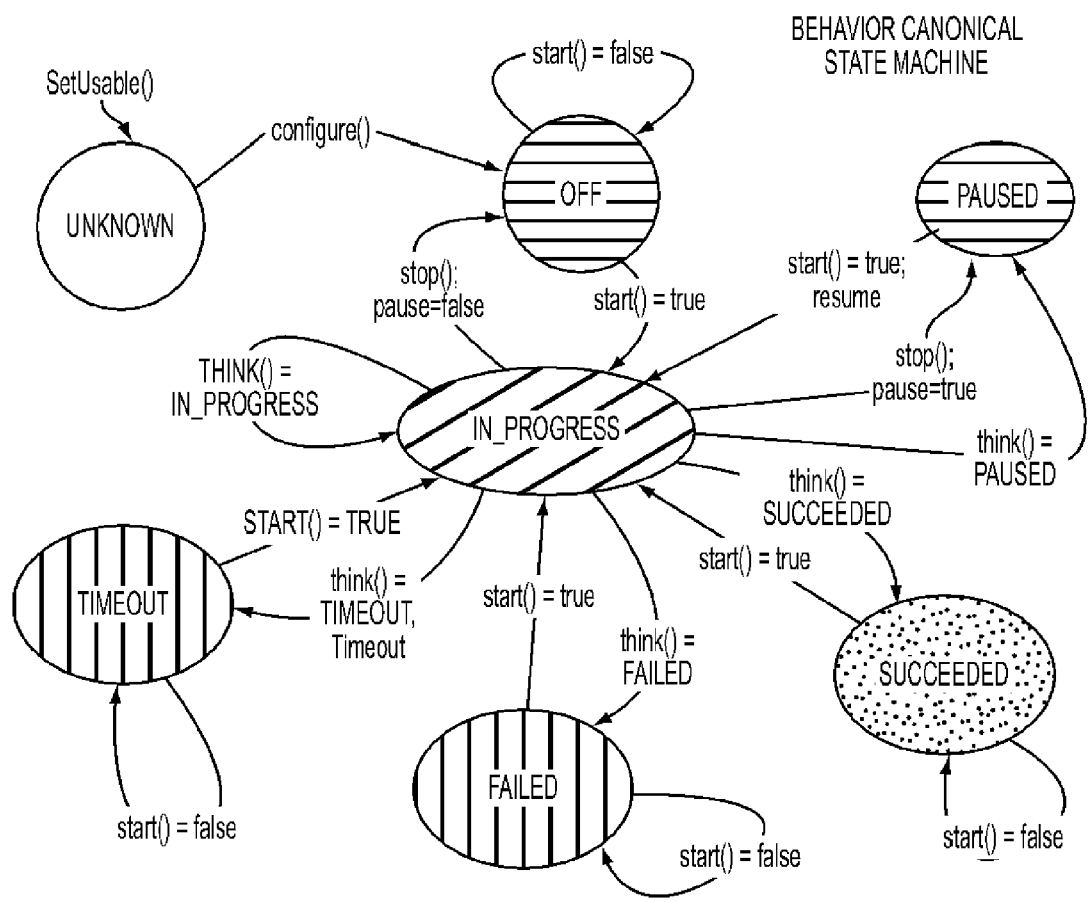
FIG. 5 is a schematic diagram illustrating an exemplary state transition diagram in accordance with the present teachings, for example for behavior instances of an existing behavior system.

FIG. 5 illustrates a state transition diagram for the states set forth above in accordance with the present teachings, for example for behavior instances of an existing behavior system. A collection of behavior state values can be encoded in an enumerated type called BehaviorStatus. The think( ) method on behaviors returns BehaviorStatus as does the getStatus( ) method. The BehaviorStatus type is equality comparable and is also used as the canonical feedback from a behavior to support the framework functionality. The present teachings contemplate providing a significant number of reusable "building block" behaviors for the architecture, but the creation of new behavior implementations will remain a commonplace activity. Thus, the present teachings make the creation of behavior components very straightforward, and the protocol for behaviors can be provided by a reusable base class implementation called BehaviorImpl that greatly simplifies the creation of behaviors compatible with the architecture. Much of the state machine logic and protocol functionality is implemented by the BehaviorImpl and behavior authors generally only need to fill out a handful of callback functions to implement custom behaviors.

Figure 6:
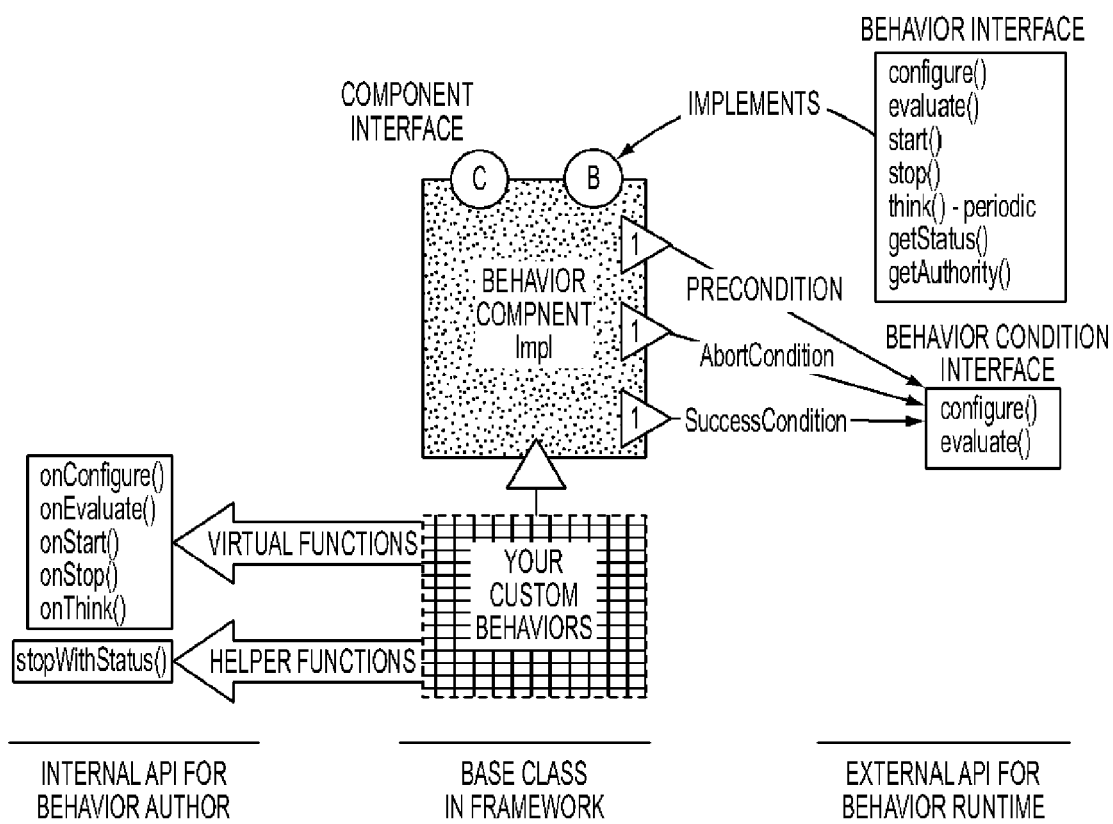
FIG. 6 schematically illustrates an exemplary embodiment of the structure and relationship of behavior interfaces and a behavior base class for authoring new behaviors.

The structure and relationship of the behavior interface and the base class is shown in FIG. 6. Like all callback-based frameworks (e.g., GUI systems, etc.), it is expected that the individual behavior callback implementations do their work and exit quickly. In certain embodiments, if a long-running computation is needed, the behavior can split the computation up in some way or manage an alternate thread to deal with the computation. In certain embodiments, support for this may be added under an advanced usage scenario at a later time.

Defining the 5 callback functions on Configure( ) on Evaluate( ) on Start( ) on Stop( ) and on Think( ) can defines a complete behavior. Simple behaviors do not need to provide a lot of implementation for the callback functions and can ignore them and just fill in on Think( ) to implement a complete, reusable behavior by defining a single function. This design approach allows behavior implementers to "fall back" to adding a known component feature to a behavior and extend a behavior to be as complex as necessary for its purpose.

Figure 7:
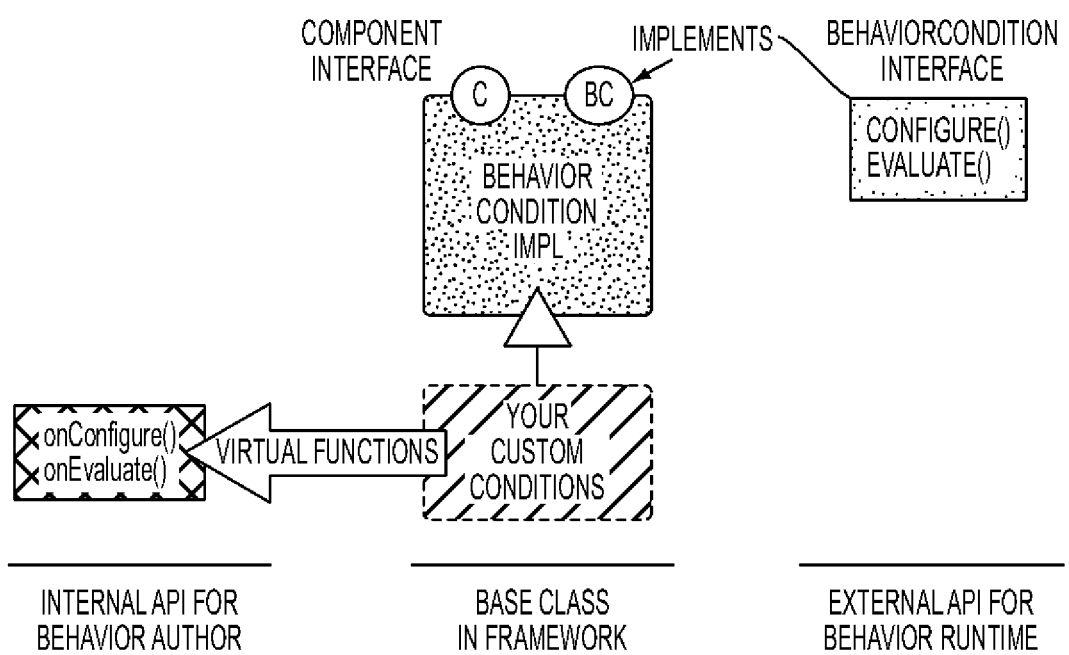
FIG. 7 schematically illustrates an exemplary embodiment of the structure and relationship of behavior interfaces and a behavior base class for authoring conditions for new behaviors.

Conditions: The code set forth above shows that BehaviorImpl has connections to three BehaviorCondition interfaces. These are built-in extension points that allow users of behaviors to customize the preconditions, abort conditions, and success conditions of a behavior. The base class handles the implementation so that the appropriate protocol implementation is selected for all of the components. The basic design dictates that any behavior can have a pluggable precondition (start( ) returns False), abort condition (think( ) returns FAILED), or success condition (think( ) returns SUCCEEDED). Condition plug-ins can be added as Connection Var< > objects in custom behaviors as desired to support additional plug-in customization of behavior execution. The present teachings contemplate providing a significant collection of reusable condition implementation components that can be connected to customize a behavior network. However, customized conditions will invariably be required. Therefore, a BehaviorConditionImpl base class can be provided to simplify the creation of conditions. The BehaviorConditionImpl base class can provide two callback functions: onConfigure( ) and onEvaluate( ) Creating a component that implements these two functions creates custom conditions. An exemplary condition implementation support is shown in FIG. 7.

Figure 8:
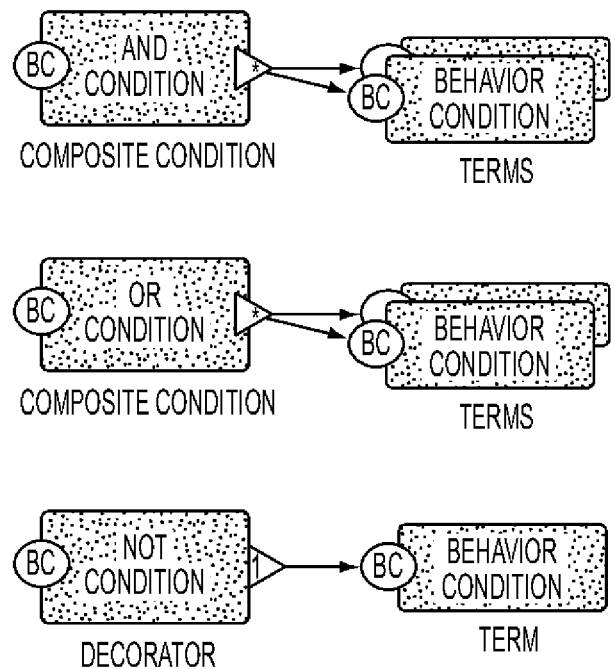
FIG. 8 schematically illustrates compound conditions for behaviors.

In addition to the basic support for adding custom conditions, various embodiments of the present teachings can provide a collection of simple compound conditions that can "plug together" logic trees of existing conditions. The compound collection can include AND, OR and NOT operators, which help generalize a set of conditions and allow combination of existing conditions in new ways just by connecting them together. FIG. 8 illustrates exemplary compound condition components. AND and OR provide a compounded logical operation for all connected conditions and return the short-circuit result for the logical operator (i.e., connected condition gets called unless it's necessary).

Figure 9:
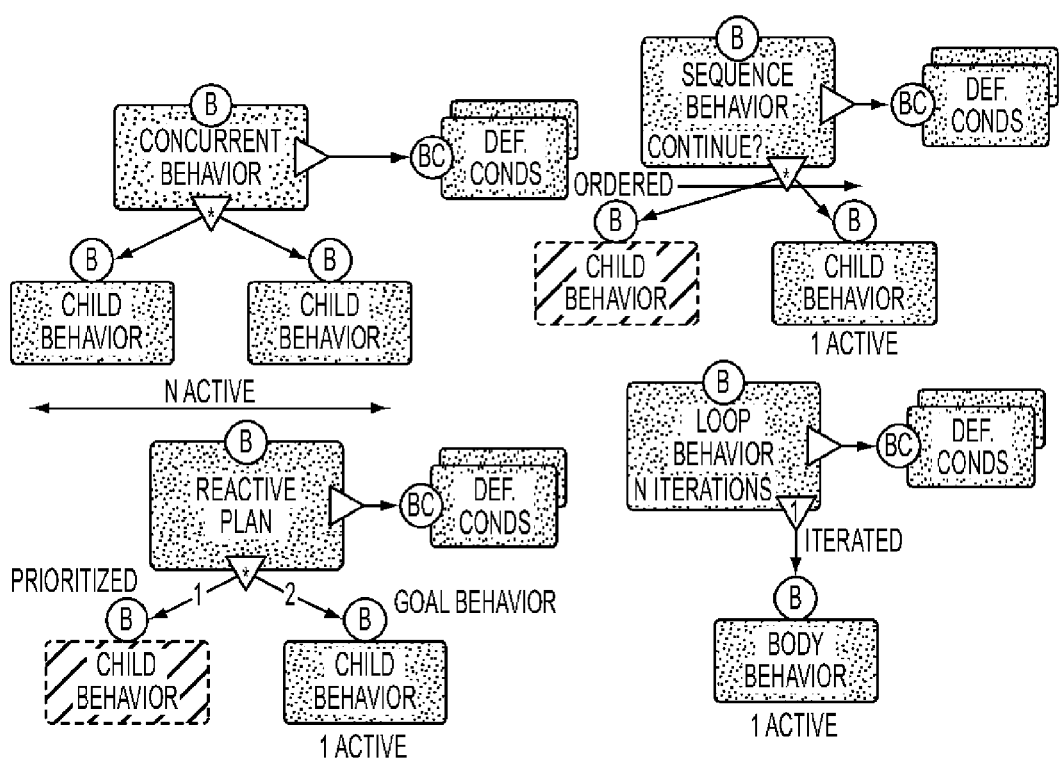
FIG. 9 schematically illustrates some exemplary core compound behaviors.

Compound Behaviors: In order to build up a complete application, the present teachings contemplate more than a few behaviors that do X and more than a few conditions that check Y. The present teachings thus can include standard ways to sequence, loop, and otherwise coordinate the operation of behaviors to form the core logic of a complete application. FIG. 9 schematically illustrates some exemplary core compound behaviors. Compound behavior implementations can be provided to assist in sequencing, looping, and otherwise coordinating the operation of behaviors. The description below provides an exemplary set of compound behavior implementations to illustrate the concept, but one skilled in the art will understand that the set of compound behaviors will grow over time as needed to flesh out a set of reusable "built in" components that developers can use to configure their behavior trees. The core set of compound behaviors can comprise the following:

Concurrent Behavior—This behavior runs all child behaviors together. It evaluates to the evaluation of the lowest child, starts if all children can start and exits if child exits with the same condition as the exiting child.

Sequence Behavior—This behavior runs a sequence of child behaviors in a particular order. It evaluates to the evaluation of first child, starts if the first child can start and iterates over subsequent children as each previous child exits. It can be configured to fail if a child fails or continue to the next child if a child fails. Remaining time before timeout can be sent to each child that is started.

Loop Behavior—This behavior runs a single child behavior over and over again for a predetermined number of iterations. It can be configured to fail if any child fails or continue on child failure. Remaining time before timeout can be sent to the body each time it is started.

Reactive Plan Behavior—The reactive plan behavior has a prioritized set of child behaviors. It evaluates (using the evaluate( ) call) and runs the child with the highest priority that meets an evaluation criterion set as a property. For each cycle, it can switch between active child behaviors based on how the children evaluate. This is a more formalized version of the previous "select" behavior that generally represents a sequence of steps of progress and can "fall back" to previous steps and try to build back up or a selection among exclusive options. When the highest priority child of a reactive plan behavior succeeds, the behavior succeeds, exiting the plan. If no children can be started once the reactive plan has started, the Reactive Plan Behavior fails. Remaining time before timeout can be sent to each child that is started.

Finite State Machine Behavior—The finite state machine behavior uses connection data for transitions attached to each child node. This connection data is a transition table that defines the next state and resulting state machine value for each child node return value. The transition table also supports pluggable conditions that trigger an extensible set of plug-in transitions for the state machine, which allows flexible state machines to be configured via tables, rather than implemented custom built over and over again. Remaining time before timeout can be sent to each child that is started.

The compound behaviors can be customized with plug-in preconditions, abort conditions, and success conditions, allowing customization of the basic coordination between child behaviors.

Figure 10:
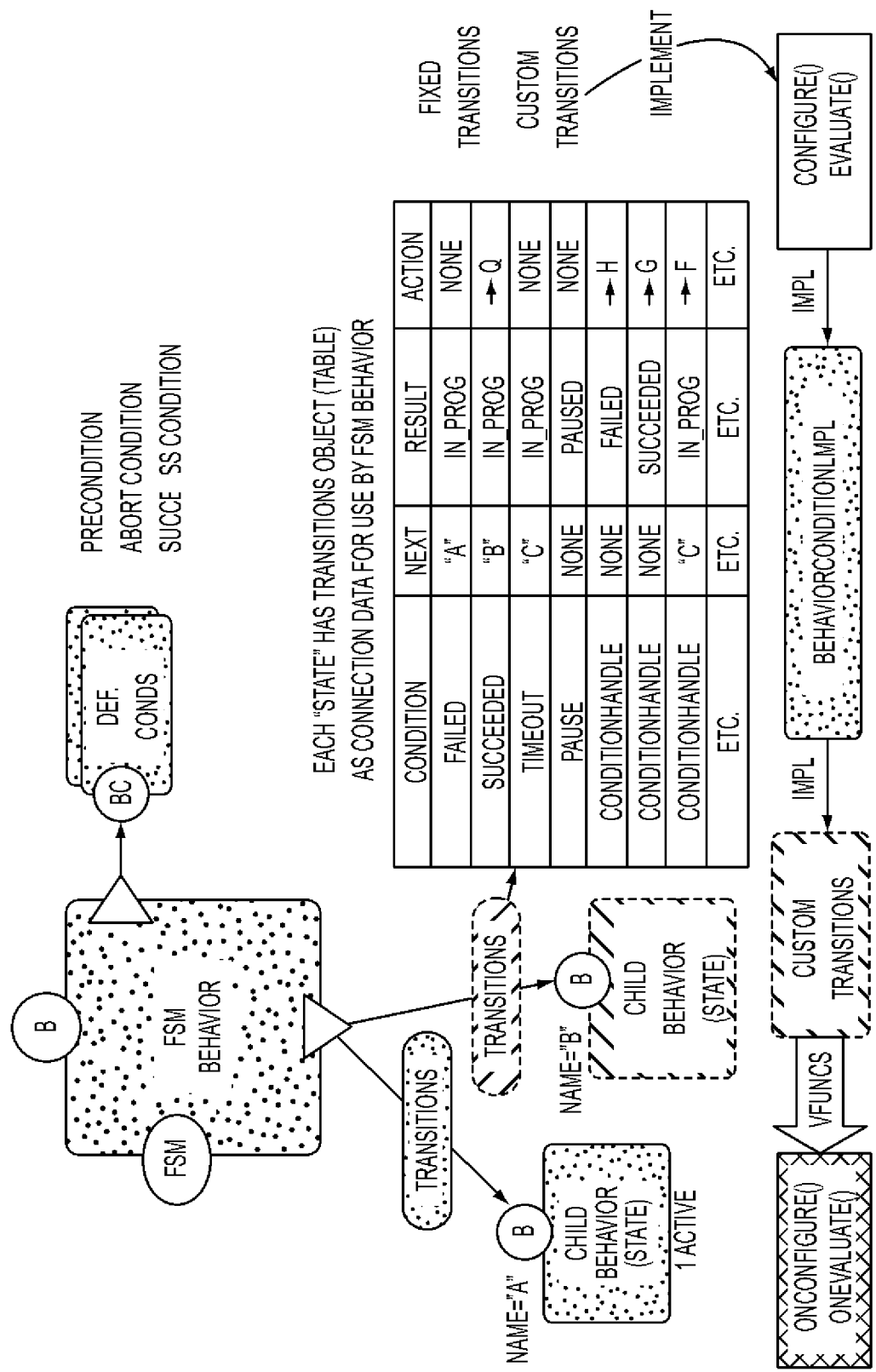
FIG. 10 schematically illustrates an exemplary embodiment of a finite state machine behavior showing an exemplary transition table structure.

FIG. 10 schematically illustrates an exemplary embodiment of a finite state machine behavior showing an exemplary transition table structure. The finite state machine (FSM) behavior can be more complex than other behaviors, because it requires non-trivial connection data to configure the transition tables for each child behavior. Using the transition tables allows any child behavior to be used as a state for the FSM behavior without the child behavior needing to know that it is an FSM state. The existing semantics of behavior execution can support full state machine semantics. This allows the FSM behavior to implement a local policy keeping all FSM-related code in one place and maintains the compositional nature of the behavior tree, and thus allows behavior system components to embed finite state machine capabilities within behavior trees as needed. As shown, the transition data structure encodes two kinds of basic transition information for use by the FSM behavior. The two kinds of basic transition information table entry types define: (1) the next state of the state machine by child component name as a string; (2) the return status of the FSM behavior as a BehaviorStatus code; and (3) a handle to a behavior system interface to be invoked as the transition action.

In accordance with certain embodiments, the fixed set of transition triggers can be based on the child behavior (state) return status. The trigger of a transition can occur when the child behavior returns a given status from a think( ) call. The custom transitions can comprise an extendible set of transition triggers, which are a collection of BehaviorCondition handles. These handles are called to evaluate transitions from a state during the think( ) processing in the FSM behavior. When a condition returns true, the remainder of the transition table record is used to determine the next state and the return status of the FSM behavior, and to invoke connected actions.

Internal Finite State Machine Utility: In addition to the state machine behaviors, which allow run-time composition of state machines from components, the present teachings contemplate having a set of distinct internal states within a component. The framework provides the FsmImpl utility class and associated helper classes to help write more explicit state machines inside of component code. The basic concept of the design is that the FsmImpl is a decorator that can be added to an existing component, and which implements a very simple FSM API, allowing external code to send events to the state machine to query the state. The decorator can handle the bookkeeping and can provide a simple update call for the component implementation to update the state machine.

Each state of the state machine can be implemented as a class. A component creates instances of the states it wants and registers them with the FsmImpl to implement an explicit state machine, which can simplify coding in various periodic update methods. Update methods can change the state of the state machine in response to various conditions with a single method call. The model of states used is that each state is periodically called to do work through its update( ) method, and that states have their enter( ) and exit( ) methods called when the state changes to handle any setup or cleanup. Thus, changing states means calling exit( ) on the current state and enter( ) on the new state. The present teachings can comprise a templated helper base class called FsmStateHandler that simplifies writing derived state classes. The present teachings can also comprise a templated helper class called FsmStateAdapter that acts as a surrogate state object and allows binding of function pointers to state callbacks in the state machine.

These utilities can work together to define and use explicit state machines in behaviors and other system components as needed. The structural approach of separate state classes can provide a clear way to express the separate actions resulting from different states in a component. The code below shows the creation of an exemplary FsmStateHandler-based state machine as part of a component. All state handlers have a target object to which the state code can refer. This can be used to create a "backpointer" reference to the containing component code so that the state classes can call the component functions. Depending on the situation, states can be limited to calling only the public API of the containing component, or states can be defined as class friends and treated as part of the component implementation itself.

```
#include <aware/ComponentImpl.hpp>
#include <aware/rf/FsmImpl.hpp>
// Factory code omitted for brevity
class MyComp; // Forward declaration.
// This is a state handler class.
class FirstState : public FsmStateHandler<MyComp> {
public:
    FirstState(const std::string& name, MyComp *cmp):
        FsmStateHandler<MyComp> (name, cmp) { };
    virtual void update(FsmImpl& fsm,
            ChronometerTime tNow,
            WorkingMemory& wm);
};
// Another state handler.
class SecondState: public FsmStateHandler<MyComp> {
// Same kind of thing...
};
// Component (inline code for brevity)
class MyComp: public ComponentImpl {
public:
    friend class FirstState;
    friend class SecondState;
    MyComp(const std::string& name) :
        ComponentImpl(name),
        m_fsm("Fsm", this) {
        // Build state machine
        m_first = m_fsm.addState(new
                FirstState("First", this));
        m_second = m_fsm.addState(new
                SecondState("Second", this));
    }
    // Method that updates the fsm:
    void someMethod( ) { m_fsm.update(...); };
protected:
    FsmImpl m_fsm;
    int m_first;
    int m_second;
};
FirstState::update(FsmImpl& fsm,
        ChronometerTime tNow,
        WorkingMemory& wm) {
// Do some work and goto next state for next time...
    fsm.gotoState(getTarget( ).m_second);
};
```

Working Memory: The elements of a behavior system in accordance with certain embodiments of the present teachings can communicate thorough a shared area called Working Memory. Working Memory can provide an implementation of a slot-and-filler structure that supports arbitrary value types based on using boost::any. Items in working memory are named with a string key, which can have arbitrary structure, and items can be accessed by key or by looking up a key to get a cursor. The cursor stores the result of item lookup and allows a client to cache the lookup to access working memory items extremely efficiently at runtime. This approach can allow behaviors to use working memory items extensively to share mutual state variables within groups of collaborating behaviors. The data items are typed, managed, time stamped, and access is coordinated through the behavior engine so that cohesion is maintained, but there is no explicit coupling of API or compile-time dependency introduced by the sharing of Working Memory items.

It is possible for Working Memory items to be erased and reused, and the cursor instances that cache lookup can become invalid. This is handled by having a "generation"

counter on each cursor and slot in memory. Code that needs to operate regardless of the contents of Working Memory will need to check the validity of cursor objects.

The behavior engine is responsible for managing the Working Memory and can lock Working Memory before calling the behavior tree—and then unlock Working Memory when the behavior tree is done with each cycle. This provides lock-free access to Working Memory for all behaviors, reducing the cost of Working Memory usage for behaviors so that behaviors can use Working Memory in necessary ways.

Figure 11:
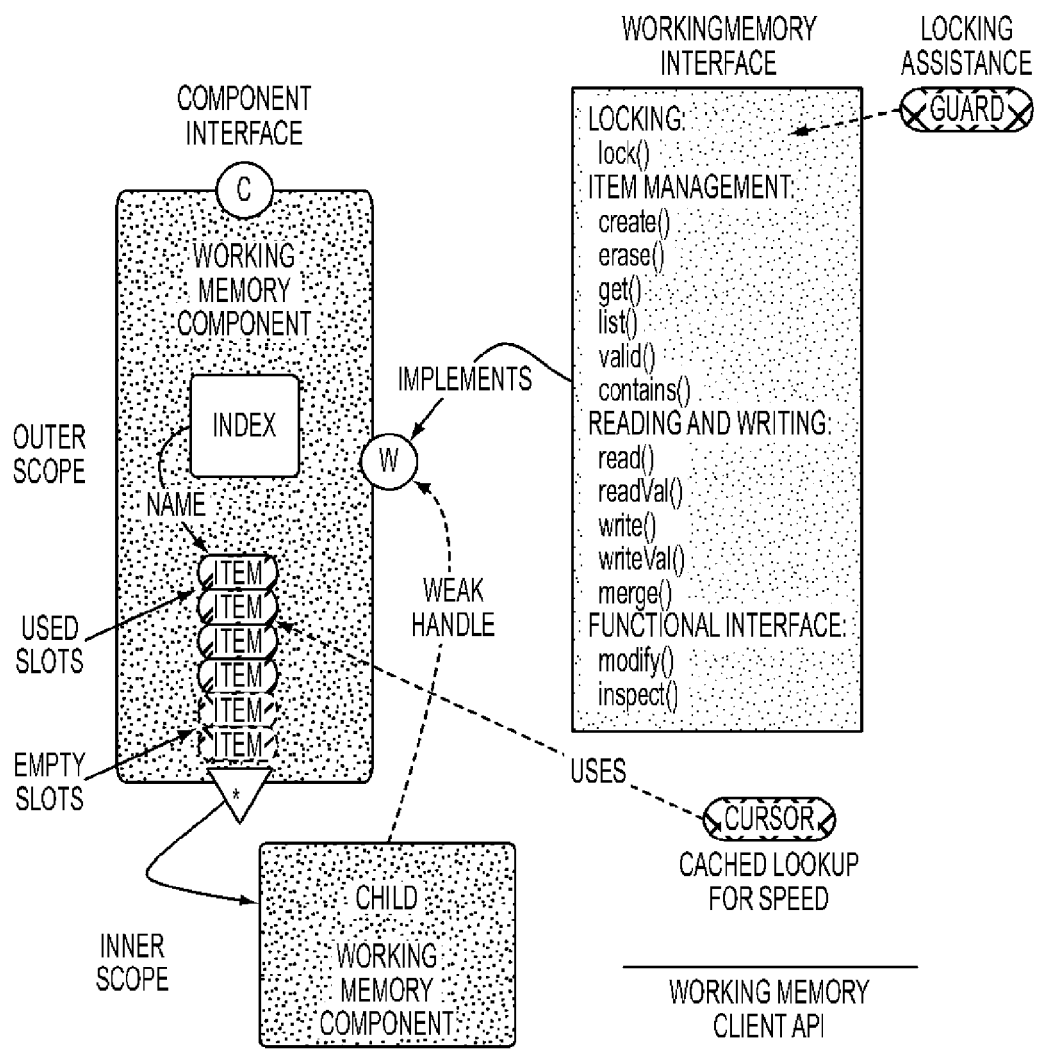
FIG. 11 schematically illustrates an exemplary working memory structure for a robotics system in accordance with the present teachings.

In various embodiments of the present teachings, Working Memory instances can be connected in a tree to form a tree of nested scopes. Clients of a leaf scope resolve references to local Working Memory if the key is defined locally (just like local variables in functions) and they recursively resolve the name up the tree to more global scopes (just like global variables). The structure an exemplary working memory is shown in FIG. 11.

Resource Controllers: In accordance with various embodiments of the present teachings, any of the "big behaviors" of the previous behavior system like waypoint following, basic driving, poses, and obstacle detection/obstacle avoidance can be built into resource controllers with simplified, explicit APIs. The resource controllers are responsible for online control of specific resources of the remote vehicle (e.g., the drive system, manipulators, lights, etc.). APIs can therefore be domain specific for a particular kind of resource and present a much more procedural interface for developers to use when implementing behaviors.

The set of resource controllers is open and depends on the hardware configuration of the remote vehicle (e.g., the type of drive system, number of arms, etc.). This is one reason for the configure( ) functionality callback throughout the system, which allows for runtime application dynamic configuration and lookup of new resource controllers as needed.

Each resource controller can be responsible for a particular remote vehicle resource, and can provide feedback from the resource into Working Memory. The resource controller can additionally take commands from behaviors in the form of transaction objects. Behaviors can use resource controllers in the following way:

During configure( ) the relevant resource controllers are located and cursor data is cached.

During think( ) the behavior prepares one or more transaction objects (commands) and then writes the transaction objects to the relevant resource controllers (e.g., writing a drive transaction to the drive controller, a discrete transaction to the discrete controller, etc.)

The Behavior Engine calls commitTransactions( ) on resource controllers after the entire think( ) cycle is complete for all behaviors. This allows resource controllers to latch the commands internally for their next cycles of operation, and allows resource controllers to run on concurrent background threads (and, in certain embodiments, on specialized hardware), improving the scalability of behavior engine performance.

Figure 12:
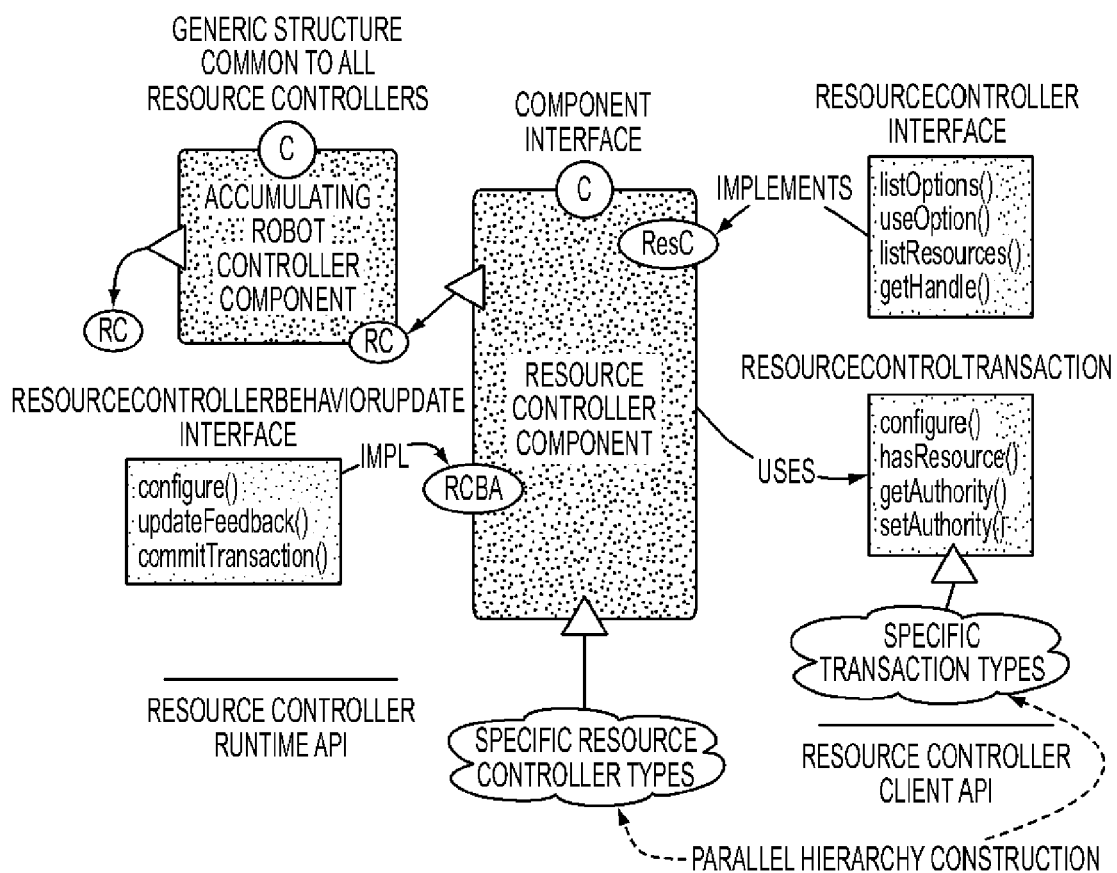
FIG. 12 schematically illustrates an exemplary generic structure common to all resource controllers.

An exemplary generic structure common to all resource controllers is shown in FIG. 12. The design of resource controllers and transactions is a shallow parallel hierarchy approach. For each kind of resource controller interface, there is a domain specific (e.g., drive, manipulate, discrete, etc.) transaction API corresponding to the resource controller interface for the functions provided by resource controller. All transaction APIs can derive from a common transaction base class API. The use of derived class APIs and transactions can allow the extension of existing APIs through inheritance without recompiling client code, allowing necessary evolution of the resource controller interfaces with minimal long-term impact.

Resource controllers in accordance with the present teachings can eliminate large amounts of command "buffering" code that occurs in existing action selection engines by having each resource controller directly connected to a single adapter component that provides an accumulation-based implementation of an existing remote vehicle controller API (and can itself plugs into the current remote vehicle controller component for 90% of its functionality). Essentially it is a policy decorator for the remote vehicle controller, and eliminates false coupling between the behavior engine and behaviors and the remote vehicle controller API present in existing systems.

Figure 13:
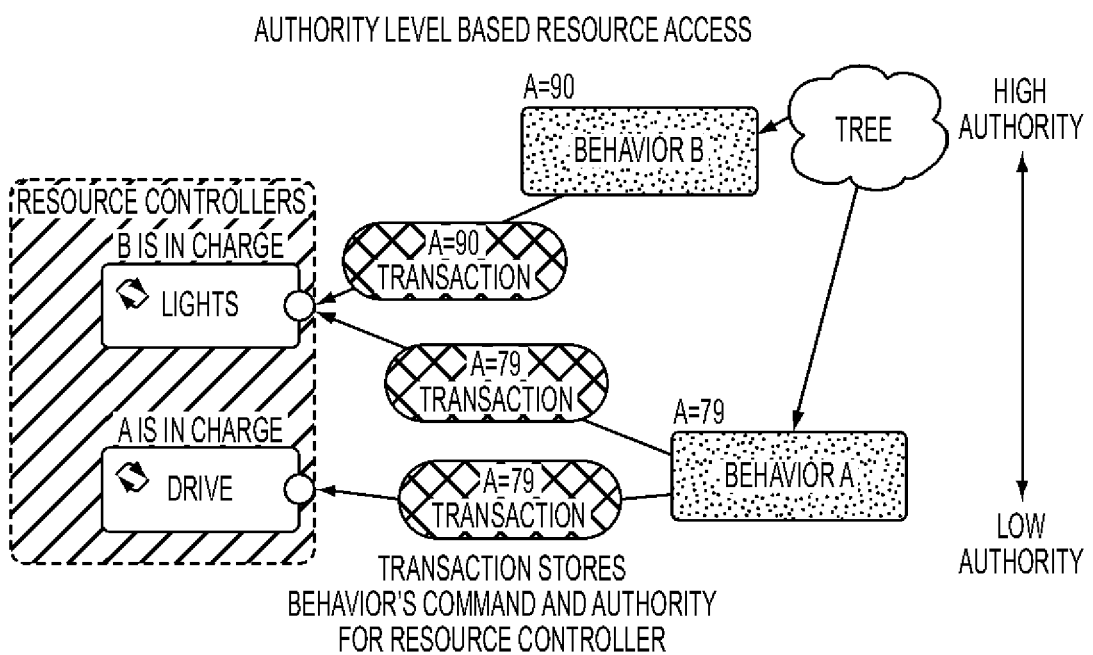
FIG. 13 schematically illustrates an exemplary authority mechanism in accordance with certain embodiments of the present teachings.

FIG. 13 schematically illustrates an exemplary authority mechanism in accordance with certain embodiments of the present teachings. Given that behaviors can call any resource controller during their various callback functions in arbitrary order and that there is no reason various behaviors couldn't send conflicting commands to resource controllers, something needs to prevent chaos. In various embodiments of the present teachings, therefore, the behaviors can be provided with an authority value in their start( ) methods. Each behavior can use the authority value for all transactions with resource controllers in the system. The core framework classes can automatically assign authority values based on tree traversal, and the authority values can provide a unique preorder traversal of the entire behavior tree. Behaviors higher up in the tree and earlier in the set of child behaviors are higher in authority than behaviors lower in the tree or later in their set of siblings.

The authority mechanism provides an efficient implementation of resource controllers that pursues a single coherent goal at a particular time, which supports coherency of the behavior system with very low implementation overhead and can support debugging of resource contention problems, while minimizing additional wiring/coupling and routing to try to design out any possibility that two behaviors talk to the same resource controller. The authority mechanism should be used to provide a single unambiguous definition of which command a resource controller will obey if given more than one command.

FIG. 13 shows two behaviors, Behavior A and Behavior B. Behavior A is located higher up in the tree and thus has a higher authority value (A=90) than Behavior B, which is located lower in the tree and has a lower authority value (A=79). Both Behavior A and Behavior B require the Lights resource, and Behavior B will be given priority to use the Lights resource due to its higher authority value and thus has control of the Lights resource. Because only Behavior A requires the Drive resource, it controls the Drive resource.

The following paragraphs describe exemplary initial resource controller implementations and structure, ranging from simple to complex.

Figure 14:
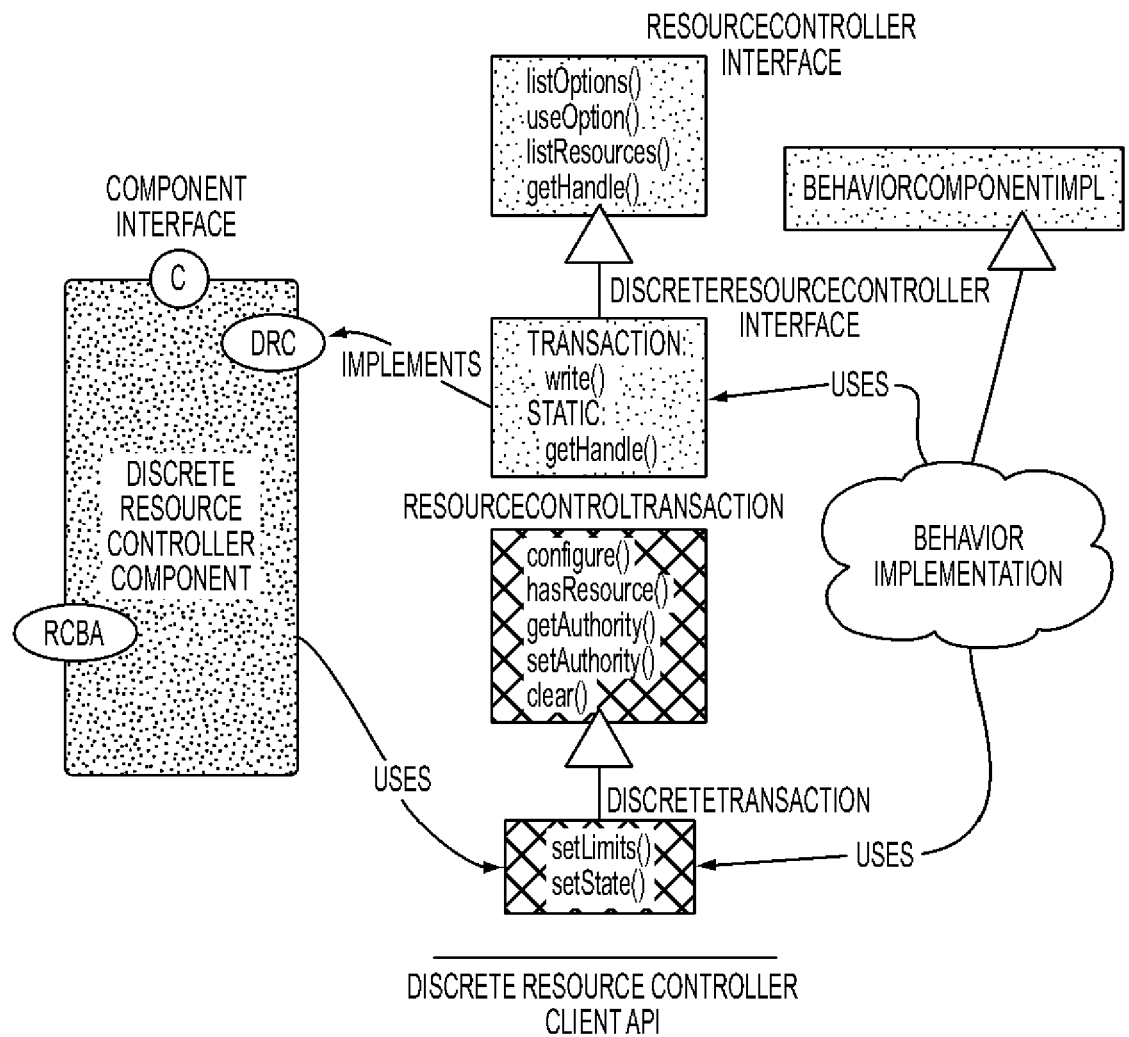
FIG. 14 schematically illustrates an exemplary embodiment of a discrete resource controller in accordance with certain embodiments of the present teachings.

Discrete Resource Controller: An exemplary embodiment of a discrete resource controller is schematically illustrated in FIG. 14, which shows the simplicity of a robotics system in accordance with the present teachings. Rather than an awkward evaluation-based selection of outcomes and handling everything through an evaluation function, clients of the DiscreteTransaction API just set the bits they want set.

In the embodiment of FIG. 14, the Behavior Implementation uses setLimits( ) and setState( ) from DiscreteTransaction, which are sent to ResourceControlTransaction. Behavior Implementation also uses write( ) and getHandle( ) from DiscreteResourceController Interface, which are sent to ResourceController Interface. The Discrete Resource Controller Component also uses setLimits( ) and setState( ) from DiscreteTransaction. DiscreteResourceController Interface implements the discrete resource controller (DRC).

Figure 15:
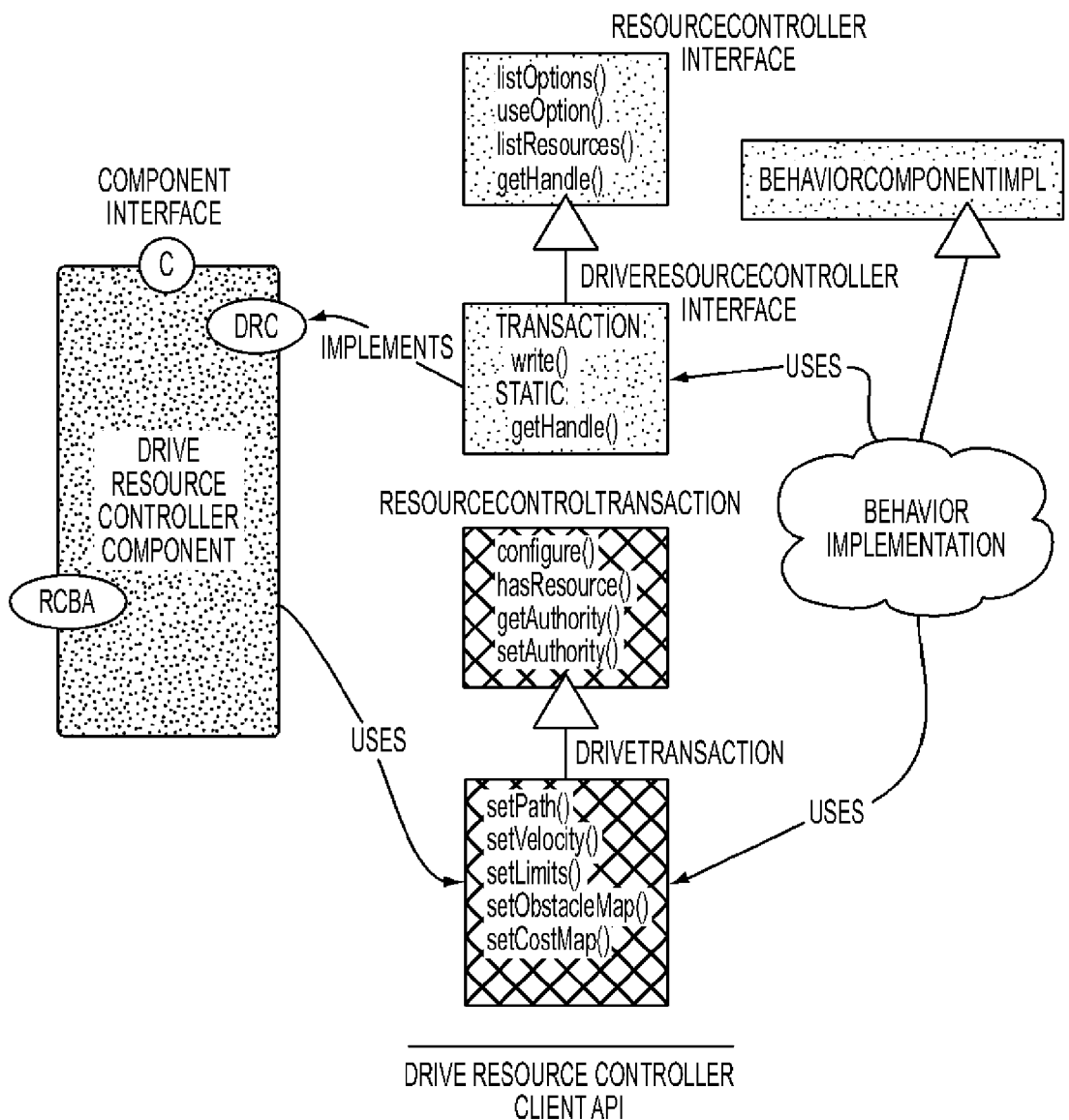
FIG. 15 schematically illustrates an exemplary embodiment of a drive resource controller in accordance with certain embodiments of the present teachings.

Drive Resource Controller: An exemplary embodiment of a drive resource controller is illustrated in FIG. 15. The drive resource controller can implement existing remote vehicle driving functionality in a simple API, and can provide basic command setting (velocity drive) along with waypoint path execution, integrated path planning, and obstacle detection/obstacle avoidance. These features may no longer be separate behaviors that get managed, but rather may be "built in" parts of the drive resource controller, which can have several benefits:

Access to functionality is through a single API, not an ad-hoc collection of events.

The core search algorithms used for the kinodynamic planning no longer operate over the behavior tree (and have the associated locking overhead, etc.).

Core search algorithms operate on threads (e.g., one or more threads) independent from the main behavior thread, allowing significantly more concurrency in the system while simultaneously reducing complexity for behavior writers. In addition, operation of the search is not synchronous with the think( ) cycle, which allows better reactivity and lower effective latency for driving commands.

Core search algorithms can be re-implemented internally to take advantage of future GPGPU- or OpenCL-style processing acceleration with no impact on behaviors externally.

While the illustrated drive resource controller has only 5 functions, when combined with some options, it can allow expression of a variety of existing or envisioned driving commands used by systems such as obstacle detection/obstacle avoidance while driving, waypoint following, and many kinds of obstacle detection/obstacle avoidance where obstacles are expressed as local maps (including, e.g., cost maps) computed by behaviors. The illustrated drive resource controller can provide an extremely flexible and sensor-based control over driving, without coupling behaviors tightly to the search process.

In accordance with certain embodiments, the drive resource controller runs a constrained kinodynamic motion-planning algorithm to select commands for the actuators based on given goals and constraints. Constraints can be combined from, for example, three sources: (1) feedback of limits from low-level controls (e.g., a maximum speed of the remote vehicle); (2) a configuration set in each application (e.g., the remote vehicle will have a given maximum speed for a given configuration, which can be set in a drive model or a manipulation model); and (3) constraints provided by behaviors to the resource controllers. The constraints can be combined to find a smallest (most constrained) space for action. In certain embodiments, if a remote vehicle can go 2.0 meters per second (low level feedback limits) the system will configure an application to only use 90% in model properties (i.e., 1.8 meters per second) and then a behavior can set the limit to a lower speed dynamically.

The constrained kinodynamic motion-planning algorithm can allow the drive resource controller to coordinate, for example, following velocities, following paths, reaching goal points, obeying kinematic and dynamic limits (acceleration and velocity) of the remote vehicle actuators, and avoiding collisions. The constrained kinodynamic motion-planning algorithm can also allow the drive resource controller to abstract away the low level details of remote vehicle motion for behaviors (e.g., skid steering versus Ackerman steering). Internal details of how the drive resource controller operates are set forth below.

In the embodiment of FIG. 15, the Behavior Implementation uses setPath( ), setVelocity( ), setLimits( ), setObstacleMap( ), and setCostmap( ) from DriveTransaction, which are sent to ResourceControlTransaction. Behavior Implementation also uses write( ) and getHandle( ) from DriveResourceController Interface, which are sent to ResourceController Interface. The Drive Resource Controller Component also uses setPath( ), setVelocity( ), setLimits( ), setObstacleMap( ), and setCostmap( ) from DriveTransaction. DriveResourceController Interface implements the drive resource controller (DRC).

Figure 16:
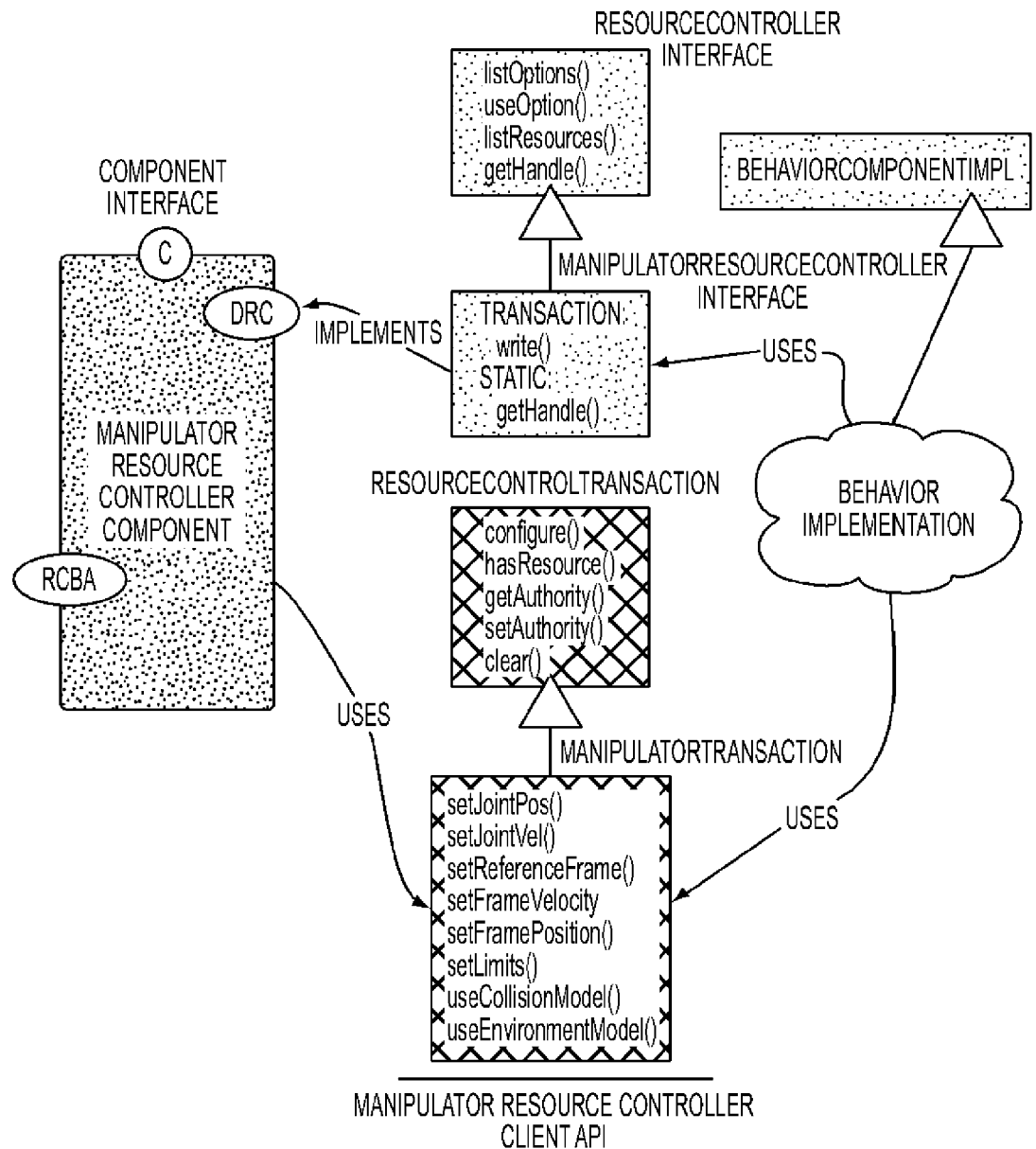
FIG. 16 schematically illustrates an exemplary embodiment of a manipulator resource controller in accordance with certain embodiments of the present teachings.

Manipulator Resource Controller: FIG. 16 schematically illustrates an exemplary embodiment of a manipulator resource controller in accordance with certain embodiments of the present teachings. Like the drive resource controller, the manipulator resource controller can replace one or more "big behaviors" with a single API for controlling manipulators. Separate manipulators can be controlled separately in accordance with certain embodiments of the present teachings, but collision information can be easily shared, which can allow cohesive operation of manipulators without completely coupling separate manipulators together for planning, which can significantly reduce the computational cost of motion planning for high-DOF systems like manipulators. Motion planning for manipulators has previously been done using an "action space" concept in an action selection engine, but in accordance with the present teachings can be done along physical boundaries tied to the remote vehicle's configuration. In accordance with certain embodiments of the present teachings, motion planning computations for multiple manipulators can proceed in parallel in multiple processors when they are available, which can facilitate running motion planners at differing rates to conserve CPU cycles.

In accordance with various embodiments of the present teachings, the manipulator resource controller provides the following control interfaces:

Joint-based commands.

Kinematic-based (frame) commands.

Manipulator self-avoidance based on kinematic models and collision spaces.

Manipulator environment obstacle detection/obstacle avoidance based on 3D perceptual maps of nearby obstacles.

The internal details of how the manipulator resource controller operates are provided in a later section of this document including an exemplary constrained kinodynamic search for commands, which is very similar to the search algorithm used by the drive resource controller and allows the manipulator resource controller to follow joint position and velocity commands and kinematic frame commands (e.g., put the manipulator tip here), while following actuator limits and avoiding nearby obstacles dynamically. The constrained kinodynamic search also allows the manipulator resource controller to offer kinematic (i.e., frame-based) control, which abstracts away the differences between various manipulators. [DESCRIBE WHAT YOU SEE IN FIG. 16]

Figure 17:
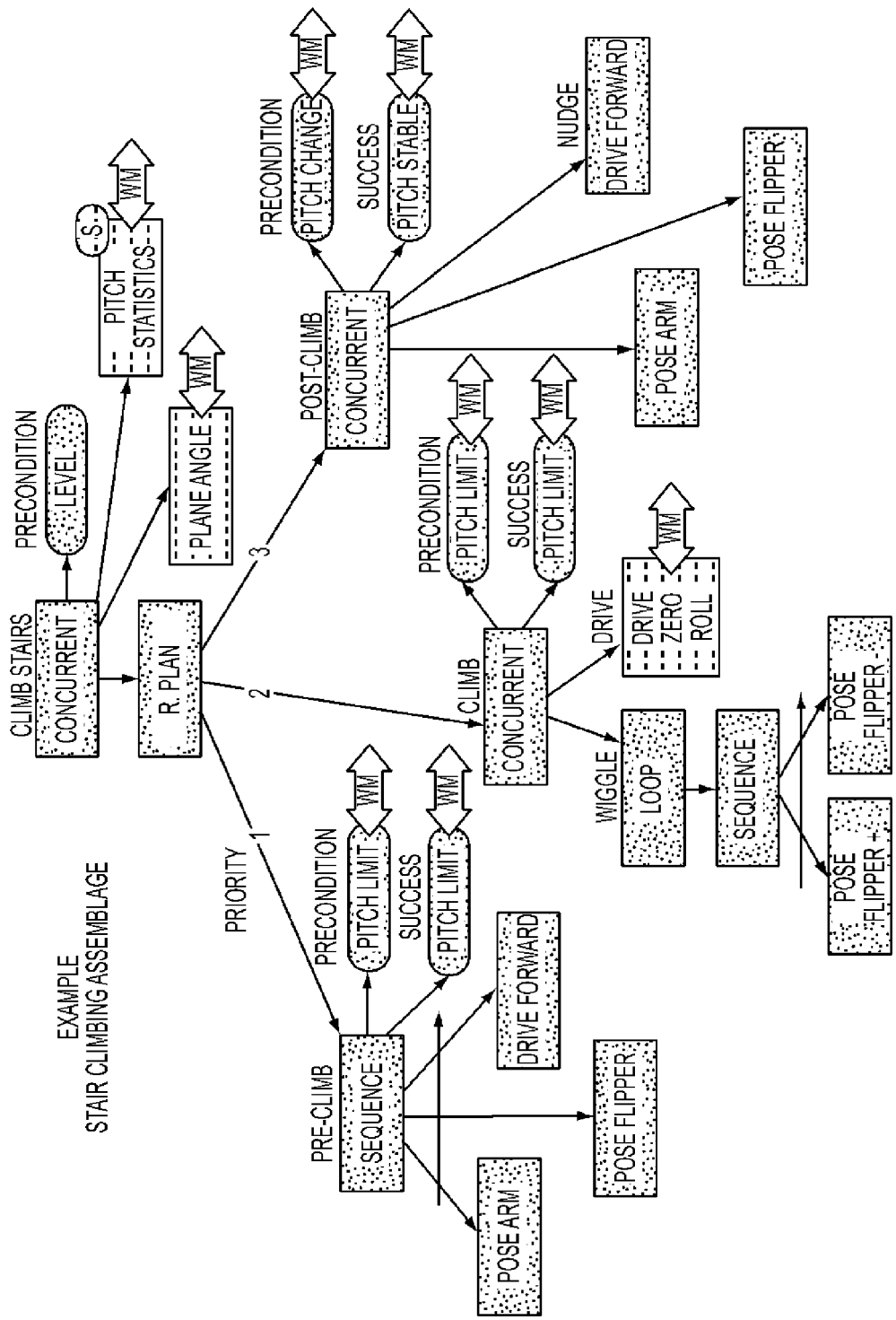
FIG. 17 schematically illustrates an exemplary stair climbing behavior assemblage.

Example Behavior Assemblage: FIG. 17 schematically illustrates an exemplary stair climbing behavior assemblage, used herein to explain how to compose a complex remote vehicle capability from simpler behavior elements, showing how each of those elements can be used together with resource controllers and working memory. The stair climbing example is simplified to aid understanding of the present teachings. Some of the layers and cases of failure handling have been omitted for clarity.

The term used herein for collections of behavior nodes built into a tree for a specific capability is "assemblage," which covers the basic idea that any particular outward "capability" of a remote vehicle is actually a collection of cooperating behaviors. Assemblages allow each behavior to be simple, easily debugged, and tested separately, greatly increasing the reliability, scalability, and reusability of behavior system code. In existing remote vehicle behaviors systems, stair climbing is a single giant behavior with its own internal state machine system, rather than being a collection of simpler primitive parts. This example shows how the present teachings can work to make creating capability more about composing collections of pre-built components with explicit coordination logic. As shown in FIG. 17, "leaf" nodes are the only nodes that send commands to resource controllers.

This behavior tree says that climbing stairs is a concurrent combination of a Reactive Plan that runs actions and two behaviors (1) Plane Angle and (2) Pitch Statistics that compute the necessary sensor values and put them into working memory for the rest of the behaviors to use in conditions and actions. The top-level behavior has a precondition based on orientation sensors for the remote vehicle that prevents triggering the stair climbing behavior when the remote vehicle is not substantially level.

The Reactive Plan node is responsible for trying to climb. The Reactive Plan node thus evaluates each of its children (Pre-Climb, Climb, Post-Climb), and runs the highest priority child that is ready (high evaluation) and can start. When the Reactive Plan node is started in a normal scenario (i.e., the remote vehicle is traversing a flat surface), it will find that the highest priority child (Post-Climb) can't run and the second highest priority child (Climb) can't run, but that the lowest priority child (Pre-Climb) can run. It will then run the Pre-Climb child, continually monitoring whether it should switch to one of the other children.

Pre-climb is a sequence that sends an arm pose to the remote vehicle, a flipper pose to the remote vehicle, and drives forward at a constant velocity to strike the stairs with the bottom flipper edge. Once the Pre-Climb sequence begins, a success trigger condition on pitch limit can trigger and Pre-Climb succeeds. The success trigger causes the Reactive Plan node to look for another child to run and this time (since the remote vehicle has now pitched up on the stairs), it finds that the preconditions for the Climb child are met. The Climb sequence is a concurrent combination of a loop (wiggle) and a custom driving behavior that uses pitch statistics in working memory and predetermined configuration properties to provide a steered driving behavior that "drives to zero roll" of the remote vehicle, making the remote vehicle climb up the stairs. The loop behavior contains a sequence behavior that alternates between posing the flippers slightly up and slightly down. This "wiggle" of the flippers has been shown to increase the effectiveness of remote vehicle stair climbing. The amount of wiggle and the exact parameters for actions (e.g., velocities, speed limits, etc.) can be set as either working memory variables or behavior system properties on the relevant components. The climb node keeps running as long as the whole behavior tree has not timed out or until a pitch is detected that it declares as success.

The Reactive Plan continuously monitors the situation. As the remote vehicle clears the top of the stairs and starts to "fall" down toward a level position, the remote vehicle's pitch velocity is detected by the preconditions of the Post-Climb tree. The Reactive Plan node can then switch execution to the Post-Climb tree and pose the arm, change the flippers, and drive forward a small remaining distance until the pitch statistics stabilize and the success condition is triggered. This means that the highest-priority Reactive Plan child has succeeded, which causes the Reactive Plan to succeed and stair climbing is complete.

Working Memory Configurations: FIG. 18 schematically illustrates exemplary working memory variable conventions for use in a robotics system in accordance with the present teachings. To avoid API coupling between behaviors and to maintain a simple behavior tree API, data sharing among different behaviors in a behavior tree is handled by writing and reading variables in working memory (Wm). FIG. 18 shows such data sharing via working memory. A general convention about the usage of working memory can help behaviors be reusable in a larger number of situations: Given that behaviors are often created as a part of an assemblage, the assemblage name can be used as a simple key mechanism to help keep working memory keys sorted out. During each phase of a behavior life cycle, the working memory is generally used following a basic pattern.

During configure( ), a behavior writes any default values that it will sample as start arguments to working memory at the location
/<Assemblage>/StartArgs/<ArgumentName> and the behavior writes any default outputs it will produce in working memory at the location
/<Assemblage>/Var/<VariableName>

During start( ), a behavior reads values from its potential input arguments from the same locations used in configure( ). Behaviors can update/cache any cursors to values they use from other behaviors to avoid extra overhead in their think( ) functions.

During the think( ) function, the behavior reads variables produced by other behaviors and updates its own output variables (if any), and the behavior can also perform other work.

FIG. 18 shows an exemplary usage pattern of working memory accesses by behavior implementations. Behaviors can be instantiated knowing what assemblage they belong to and this can be the only "shared knowledge" that couples them together. An assemblage can be implemented as a property on the BehaviorImpl, so that all behaviors can have their assemblage values set at initialization time.

Figure 19:
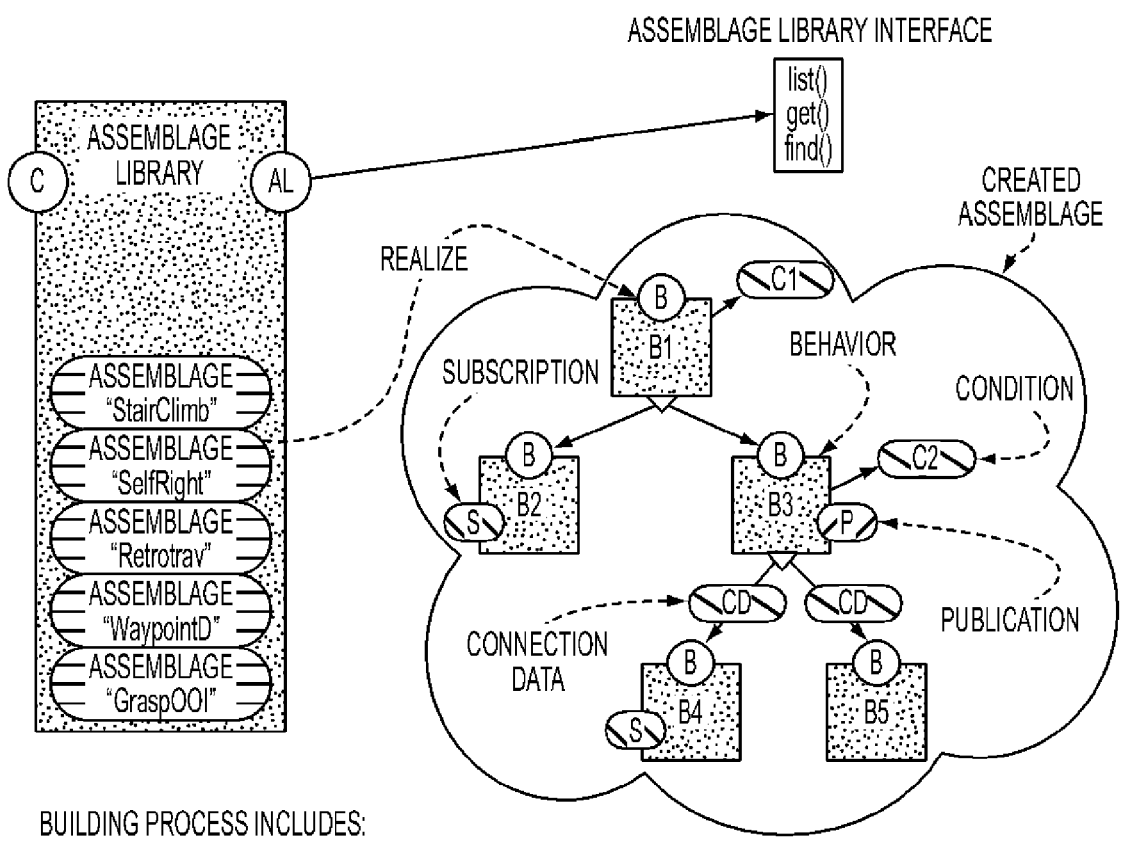
FIG. 19 schematically illustrates the concept of using assemblages and assemblage libraries in a robotics system in accordance with the present teachings.

Building Behavioral Applications: One consequence of having more structured and modularized behavior trees is the need to instantiate a sequence of configured behavior trees (i.e., assemblages) over time to accomplish specific goals with the remote vehicle. The concept of using assemblages and assemblage libraries is shown in FIG. 19. Given the above designs for the components, connections, and a defined instance hierarchy, an object-oriented, interpreted, and interactive programming language such as Python application interface can help developers create and use advanced behavior engine-based remote vehicle brains. While Python API is referred to hereinafter for exemplary purposes, the present teachings contemplate additionally or alternatively utilizing additional suitable APIs. An application interface such as Python can "close the loop" of the more powerful abstractions offered by the present teachings, and can provide a collection of programming interfaces that application developers can use to construct remote vehicle brains more easily (while using advanced behavior engine features of the present teachings underneath).

Python Behavioral Application Interface: In accordance with various embodiments of the present teachings, a Python behavior application interface provides a collection of Python classes that simplify the building and maintenance of a structured advanced behavior engine brain of a remote vehicle. The approach taken is to use the capabilities of Python scripting wrappers and component instance hierarchy to assist with creation of a management API. The primary elements of the behavioral application interface are:

- A Behavior Application class that handles the common elements in every advanced behavior engine module and sets up the basis of the component instance hierarchy.
- A Resource Manager that handles resource plug-ins used to load the resources available on a system and configure them into the Behavior Application as resource controller configurations.
- An Assemblage Manager that handles behavior assemblage plug-ins and is used to load up the available assemblages on a system and configure them into the Behavior Application on demand, based on mission needs.

Component Instance Hierarchy: Python support for reusable application objects depends on the design of a specific component instance hierarchy within application modules. The behavior system framework can provide a rich infrastructure for custom module instance hierarchies that are used to organize, locate, and manage running component instances within an application based on the Directory and Index components. An advanced behavior engine-based module can, for example, contain a root directory called "/BehaviorApplication/" and all the core supporting components for the main behavior engine setup are stored in this directory. Underneath the "/BehaviorApplication/" directory the following exemplary structure can be defined for advanced behavior engine-based modules:

- "Engine" is the behavior engine component
- "RobotController" is the remote vehicle controller component.
- "Threads/" is a directory of the main threads needed for the behavior engine.
- "ResourceControllers/" is a directory of all current resource controller types.
    - "Drive" is the drive resource controller.
    - "Manipulate/" contains a collection of manipulator resource controllers. Each of the manipulator resource controllers can have a system-defined name relevant to that particular remote vehicle.
    - "Discrete/" contains a collection of discrete resource controllers. Each discrete resource controller can have system-defined names relevant to a particular remote vehicle.
- "WorkingMemory" is the root working memory instance for the behavior engine.
- "Dispatcher" is the behavior system event processor used by the behavior engine to distribute events to all connected components.
- "Behaviors/" is the directory containing of all the currently instantiated behavior (and supporting) components, such as conditions, etc.

In addition to the behavior engine structures themselves, the following module structure can also be part of a standard setup for advanced behavior engine-based behavior system processes:

- "Background/" is the directory for built-in background processing in the module.
    - "Threads/" contains the background processing threads in the application.
    - "Perception/" contains perception processing components in the application Functionality of the /BehaviorApplication/ class is based on managing the component instance hierarchy to do things like "start all threads" in an application it traverses to the known thread locations and use wrapper interfaces to locate and start thread components. It can also use the component instance hierarchy to set the system usable or configurable as necessary.

The Assemblage Subsystem: The assemblage metaphor can be used to package up reconfigurable collections of C++ based behavior components and invoke them at runtime. Packaging an invoking C++ based behavior components can be one of the most difficult issues with using behavior trees (i.e., the need to build and configure them over and over in application code).

The basic design concept is to define the assemblage interface allowing developers to implement assemblages as Python plug-in modules and then provide an assemblage library class that uses naming conventions to automatically load available assemblages from various directories of the remote vehicle and make them available at runtime. This low-level facility is a convenient utility that simplifies reuse of pre-configured behavior trees and also provides hooks for goal-oriented behavior tree creation at runtime. The assemblage interface contains the following basic methods:

- Configure( )—Configures the assemblage as needed for the current system.
- Realize( )—Creates the assemblage based on a given situation that is supplied as a working memory reference. Returns the root node of the assemblage. This method is useful for system building, goal-oriented behavior, and complex planning.
- Special methods to support goal-oriented behavior later:
    - evaluate( )—Does this assemblage apply to the given situation? This is useful for dynamically selecting pre-built behavior trees on a goal-oriented basis.
    - predict( )—For the given situation, predict the outcome of applying this assemblage to the situation. This is primarily provided to support planning.

Figure 20:
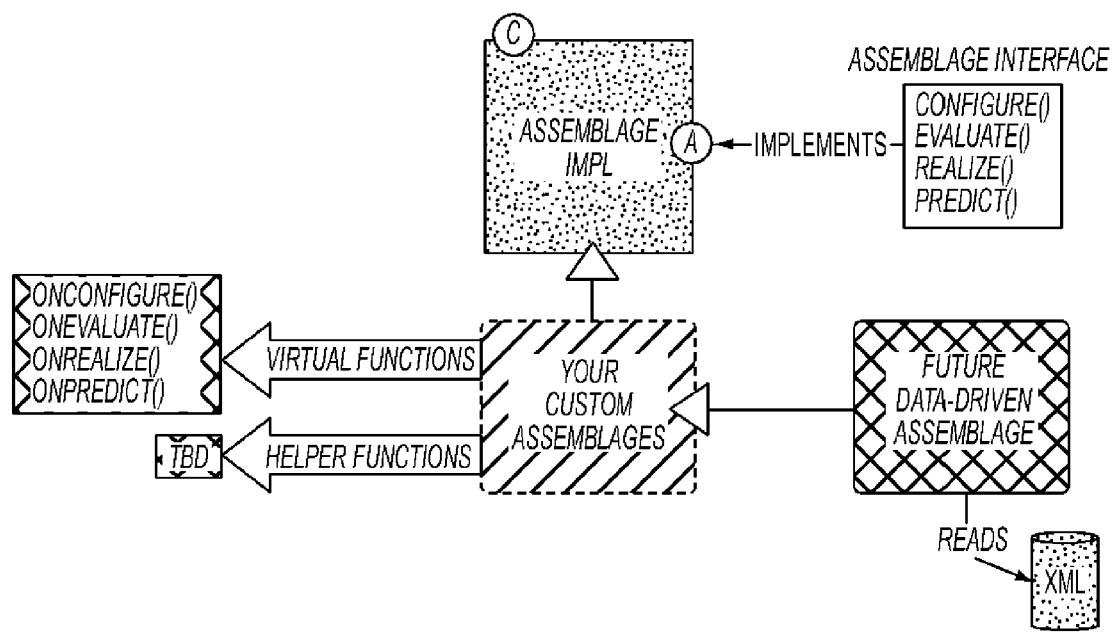
FIG. 20 schematically illustrates an exemplary embodiment of an assemblage interface and a related base class construction.

An exemplary embodiment of an assemblage interface is illustrated in FIG. 20, along with a related base class construction. While certain embodiments of the present teachings envision explicit coding of assemblage classes, other embodiments may support having assemblages loaded from data files, allowing a much more powerful and flexible assemblage mechanism. However, even a system having assemblages loaded from data files would need the same basic API to represent the assemblage and use it to realize behavior trees and potentially select the right assemblage at runtime. An assemblage library interface allows clients to find assemblages and iterate through them. It simplifies management of dynamic locations of assemblages and centralizes how the assemblages are located on a remote vehicle system. An assemblage library interface can consist primarily of list( ) and find( ) methods. An assemblage library component can comprise a property that controls its search path, and the assemblage library component can use the search path to create an index of all available assemblage components at runtime.

In accordance with various embodiments, whenever an assemblage is requested, the assemblage component can be loaded into memory and a handle to the assemblage component can be returned. The assemblage is very similar to the concept of a "class object" or a "meta-class object" for the behavior tree that it represents, and only a single instance of each assemblage ever needs to be created for a running program.

The assemblage library, assemblage implementations, and any planning based on the assemblage system (including, for example, simple goal-oriented behavior selection) are an ideal use for Python scripting support. The adaptations and mode changes required by planning happen at lower rates, benefit greatly from the more fluid Python language for assemblage implementation, and can run concurrently, separate from the closed-loop portion of the remote vehicle's intelligence using an existing behavior system interface and scripting support to modify and update the running behavior network as needed. Python scripting support can therefore simplify writing of the "realize" functionality for assemblages and can simplify making them data driven as well, since support for parsing input data formats in Python is significantly easier to use and does not require adding additional C++ libraries to the behavior system to support advanced data-driven parsing, etc. Lastly, this puts a structured Python interface and infrastructure in place for systematic reuse and invocation of behavior trees. Developers that work in a mode primarily "composing" behaviors that already exist would be able to do this entirely from Python and the assemblage library, and run-time support for goal-oriented behavior would allow the remote vehicle's application to naturally select/switch to new user-defined behavior trees based on new sensory input and values on the fly without "re-building" the entire application or sacrificing runtime performance of the closed loop think( ) cycle. This can also allow third parties to use more fine-grained behavior modules and packaged resource controller APIs more easily from scripting, essentially writing behaviors in Python (which can comprise pre-existing C++ behavior components) without sacrificing performance of the remote vehicle or using undue CPU overhead.

The power of this approach is made possible by the separation of logical concurrent control flow from the action selection search and the packaging of action selection search from within a procedural API inside of resource controller components.

Given that developers will be writing assemblages to build the behavior trees that they design, certain embodiments of the present teachings contemplate creating a collection of helper methods for component creation, connection, and tracking to simplify sub-tree construction. This collection of helper methods can arise from implementation experience as a new behavior engine is created and used. The standard behavior system component infrastructure and Python scripting wrappers provide most of the fundamental API necessary for an assemblage to realize a component as a procedural interface:

Creating components: createComponent( )
    Setting properties: setProperty( )
    Connecting interfaces with connection data: connect( )
    Setting up, aliasing, and connecting publications and subscriptions: addAlias( ) connect( )
    Initialization of components for operation: setUsable( )

Thinking of a remote vehicle mission as a sequence of high-level procedural behaviors (e.g., drive to point X, take a picture in this direction, then drive to point Y, but retro traverse back to point Z if you get lost or have trouble) illustrates that each "step" of the remote vehicle mission is really an assemblage of many sub-behaviors that handle the concurrent logical issues needed to realize that step while closing the loop with the real world.

By allowing remote vehicle behaviors to examine the state of the world, a library of available assemblages can be reviewed and instantiated to enable creation of explicit goal-oriented behavior within a dynamic behavior tree system of the present teachings. A mechanism added to allow behavior code to predict the consequences of running an assemblage in a given situation can establish a foundation for goal directed planning in the system.

While it is not necessary to use goal directed planning on a remote vehicle in accordance with the present teachings, a simple form of goal-oriented behavior (i.e., behavior that does not require planning) can be desirable. The Python design for assemblages and assemblage support is intended to provide basic hooks for supporting goal-oriented extensions by the evaluate( ) and predict( ) methods.

Behavior Engine Tools: Given the regular structure and graphical nature of behavior trees and the above description of assemblages of behaviors (e.g., stored, pre-configured sub-trees) behavior trees can lend themselves to development within a graphical editing environment. A graphical editing environment can be a good way to combat certain downsides of the highly modular, hierarchical nature of behavior tree systems so that hierarchical behavior tree systems can scale up to much more functionality without becoming unmanageable. Thus, in accordance with certain embodiments of the present teachings, a behavior tree editing tool can be created to maximize the potential for more widespread use of the system. The more effort that is put into this tool and the associated libraries of reusable behaviors and conditions, the simpler and more powerful the new behavior architecture becomes.

With graphical tools, developers such as user experience designers and level designers can build significant portions of the AI based on a graphical tool, which can cleanly segment behavior system development skill sets so that a smaller number of people could focus on building behaviors, assemblages, and improvements to the core system, and use the graphical editor tools to support a much larger number of people applying the system to problems of interest. Further, utilizing a graphical editing tool for the behavior engine components can decrease time-to-market for many non-trivial features that are desired, and provide the capability to provide very systematic application logic, represent the application logic graphically, and edit application logic easily to simplify remote vehicle application creation in general.

An exemplary behavior editor can present a common graphical notation similar to that used in this document for the behavior tree and support the following basic editing operations:

Creation of behaviors and conditions
    Setting behavior and condition properties
    Connecting behaviors and conditions
    Setting or editing connection data (e.g., like that for finite state machines or the reactive plan)
    Printing out a behavior tree diagram to use for communication or in other design documents
    Saving and loading assemblage and behavior tree configurations to/from files. This can require, for example, generalized factory builder support functionality for the behavior system that is a significant amount of work, but also has value beyond a single application.

In accordance with certain embodiments of the present teachings, in addition to the ability to edit a behavior tree, a graphical tool can include the ability to "single step" the behavior system and debug the entire application logic in a "debugging mode". This debugging capability can include:

Single step operations with fake time values
    Inspect and modify the contents of working memory for a large number of data types
    View the status of behaviors in a tree visually and watch the tree change in real-time Adjust properties on the fly (for components that support an adjustment)

View the outputs of conditions in real time as they are evaluated

Built-in behaviors can be utilized in accordance with the present teachings to implement real applications and serve as examples of usage and design intent themselves, helping developers get the "feel" for the framework more easily. The behavior library is a built-in collection of behaviors and conditions (in addition to the core compound behaviors) that form a growing set of reusable parts for users of the advanced behavior engine in applications. The behavior library can also be a complementary part of any graphical behavior editing system, for example providing a "parts library" for an EDA CAD tool.

In accordance with certain embodiments of the present teachings, implementation and usage of the system will grow the built-in collection of behaviors naturally as a part of subsequent development. The present teachings contemplate providing the following exemplary built-in behaviors:

Wait: Succeeds after a certain period of time.

Counter: Counts think cycles in a particular way in working memory.

Pose: Poses joints and axes to a given pose from working memory.

PrimitiveDrive: Low-level drive commands from working memory.

WaypointDrive: Drive a waypoint path from working memory.

PrimitiveJoint: Low-level joint commands from working memory.

ResolvedMove: Resolved (straight line) motion of manipulator along a path from working memory.

LookAt: Orient a given part of a manipulator to "look at" a target in working memory.

SetDiscrete: Set a discrete resource to a value from working memory.

Wander: Random, slowly changing drive goals.

Follow Target: Drive to follow a given target object with a given offset.

Follow Wall: Follow walls locally with a given offset.

Orient Towards: Orient remote vehicle body posture towards a target.

Maintain Level: Orient body posture to maintain level "head" pose.

In addition to the behaviors listed above, a The present teachings contemplate providing the following exemplary built-in conditions:

DiscreteInterval: Tests if given discrete resources are within a given interval.

OrientationInterval: Tests if the remote vehicle orientation is within a given interval.

OrientationChange: Tests for a recent dynamic change of orientation.

AxisStateInterval: Tests if given axis states are within a given level.

FrameStateRegion: Tests if a given frame state is within a given interval.

CounterCondition: Tests if a given counter in working memory is within a given interval.

The argument and invocation details for the above-listed built-in behaviors and conditions can be provided as part of individual component documentation.

Some traditional or typical "behaviors" from an existing behavior system are not set forth above, for example obstacle detection/obstacle avoidance and self-collision prevention, because the present teachings contemplate implementing these behaviors as command constraints available as functions to all behaviors through the Drive Resource Controller and Manipulator Resource Controller APIs.

Beyond the library of primitives, the present teachings contemplate providing several Python support classes that represent common assemblages and set up the behavior engine for typical situations. Many applications can be created by deriving their classes from these core Python application classes and customizing various behaviors as necessary.

Resource Controller Internals: The following description includes design details for the resource controllers in the system and specifically focuses on the action selection and search methods used internally to pick commands. Improvements to this portion of the behavior system are intended to yield better behavioral performance (e.g., smarter, more accurate command generation that takes into account longer time horizons) and system CPU utilization improvements (e.g., a more efficient, more concurrent search with the ability to decouple the CPU used by different portions of the search).

The discussion will focus on the drive resource controller and the manipulator resource controller, implementation of the discrete resource controller can become trivial for a system in accordance with the present teachings.

Drive Resource Controller Internals: Internally, the drive resource controller executes the current command based on a kinodynamic search algorithm of the present teachings. Existing behavior engines typically operate based on what is essentially randomized hill-climbing across think( ) cycles. A drive resource controller in accordance with the present teachings, however, can operate using a kinodynamic fixed depth motion planning (KFDMP) algorithm. A KFDMP algorithm can add the ability to plan paths with longer time horizons and to use incremental feedback from evaluators within the search.

Given constraints on behavior execution and dynamic remote vehicle action, the drive resource controller can be tasked with selecting a best feasible course of action at a high rate (e.g., 10 Hz to 20 Hz on most systems) and feeding the selected best feasible course of action as servo commands to the drive system. The selected best feasible course of action comprises sensible, goal-achieving actions within a fixed time horizon of several seconds from the current time each time a course of action is selected.

Thus, one or more drive resource controllers can select the best action over a relatively long time period frequently, which allows them to combine dynamic reactivity (e.g., to obstacles, etc.) with kinematic and dynamic motion planning incorporating the acceleration and limits of the remote vehicle's actuators.

Kinodynamic Fixed Depth Motion Planning: In accordance with certain embodiments of the present teachings, the planning algorithm produces a best feasible course of action at a very high rate. The planning algorithm takes in goals and constraints that are compiled from behavior inputs, and controls the resources by producing low-level actuator commands that realize goals expressed by the behaviors.

All best feasible actions should be dynamically feasible (i.e., within actuator limits). Many existing planning algorithms ignore this issue completely. All best feasible actions should additionally be kinematically feasible (i.e., within the kinematic structure of the drive mechanism). Many existing planning algorithms also ignore this issue completely.

A KFDMP algorithm in accordance with the present teachings seeks a "good enough" best feasible action that incorporates as much future consequence information as possible given various constraints. There is no concept or desire for an optional action, since the entire world is assumed to change and the algorithm will run again in a fraction of a second. The KFDMP algorithm should be able to generate "good enough" actions quickly on limited CPU hardware, and should incorporate feedback from various evaluations (e.g., things like goal progress and collision constraints) to search more efficiently.

Figure 21:
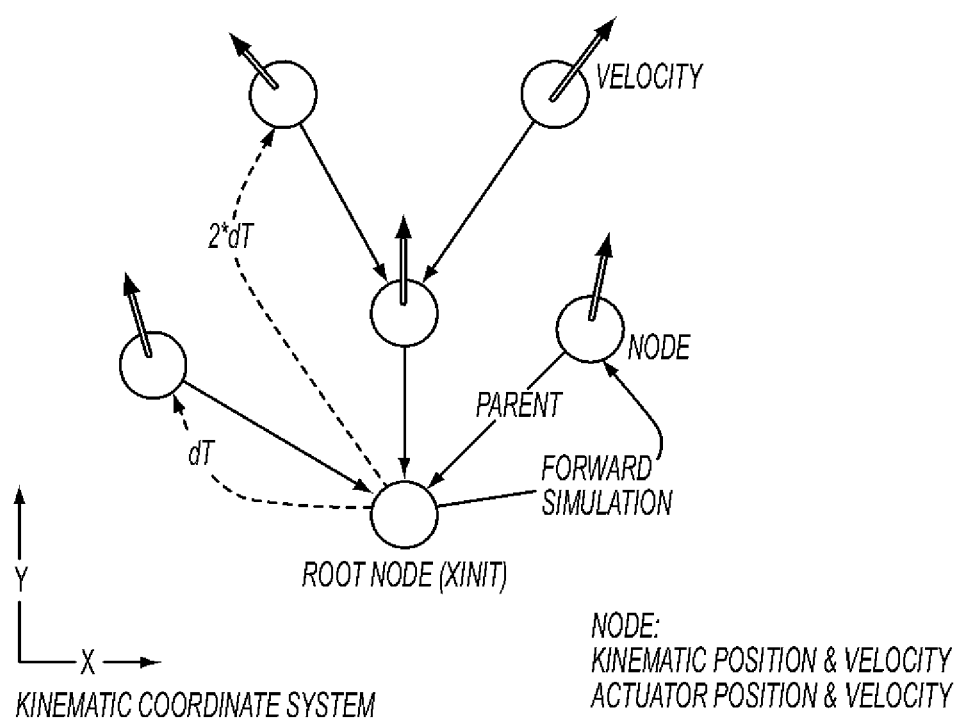
FIG. 21 schematically illustrates the basic structure of an exemplary kinodynamic tree.

In accordance with certain embodiments, the KFDMP algorithm abstracts away remote vehicle kinematics and actuators so that the same waypoint behaviors will work, for example, on cars, tanks, and unmanned ground vehicles (UGVs). The core of the KFDMP algorithm that meets these goals is the kinodynamic tree. The basic structure of a kinodynamic tree showing parent links and relationships between time, space, and state variables is shown in FIG. 21.

The kinodynamic tree is a search tree made of nodes that encode the kinematic (positional) and dynamic (velocity and acceleration) state variables of the controlled drive system. Starting from the current state of the drive system, the KFDMP algorithm can construct a kinodynamic tree by adding nodes that represent a fixed, small $\Delta T$ from the current time. Each node is added by assuming a command (acceleration) change is applied during a given time step and is integrated (simulated) through a forward dynamics model and a forward kinematic model of the particular remote vehicle drive system. These models can be plug-in objects that cover separate classes of vehicles (e.g., cars, tanks, UGVs, etc.) where a single model may cover a large number of remote vehicles within a class by setting parameters on the model. A plug-in model of dynamics and kinematics allows the planning engine to handle arbitrary holonomic and non-holonomic drive systems with arbitrary constraints.

To support searching, each node of the kinodynamic search tree is annotated with a collection of tracking variables in addition to basic dynamic state information including:

The command that generated the node

A node cost (weighted sum of evaluators applied to this node)

An expansion index and expansion counter. The expansion index counts the number of times expansion has been done on a node (to drive expansion selection) and the expansion counter contains the number of child nodes added to a node in total.

A depth counter

Evaluators are functions that map nodes to a cost function representing the goals of the remote vehicle as configured into the Drive Transaction object by behaviors. Goals can include maintaining certain velocities, reaching certain goal points, following paths, and avoiding hazards and obstacles. Each evaluator handles a different part of the cost and nodes are evaluated based on their cost, which can be a weighted sum of evaluator costs. The tuning parameters for cost weighting in the Drive Resource Controller can be mostly remote vehicle independent, but can be provided as properties to allow the system to be fine tuned for varying applications more easily.

The search for a best feasible action proceeds by building a tree of a given search depth that is herein called MaxDepth (which corresponds to a given maximum time horizon of MaxDepth*$\Delta T$) and accepting a certain maximum branching factor herein called MaxExpansions. The tree is initialized with the first node being the current kinodynamic state with a depth counter of zero and an expansion counter of zero, and evaluators are called to score the root state. The command that generated the root state is the current command feedback from the Robot Controller interface and has no parent.

The search engine maintains a priority queue of nodes by node cost and the root node is inserted into a best node queue. The priority queue is maintained as a balanced red-black tree with amortized 0(n log n) insertions, removals and 0(1) best node accesses. There is also a best expandable node queue, which only contains the best nodes that can still be expanded. No nodes that are at a maximum search depth or nodes that are expanded out can be on the best expandable queue. The first node goes on both queues. The queues exist to speed up the core search operations of finding the node with the best cost subject to certain criteria.

An auxiliary set is maintained for the best node in the best node queue. This is referred to as a refinement set. Without tracking possible refinements, the same node can be generated over and over again with no search progress. The refinement set can be used to avoid refining the same pairs of nodes over and over (since the result will be exactly the same).

The search for a best feasible action can proceed by an alternating sequence of expand and refine operations applied to the tree. The ratio of expand to refine operations need not be 1:1.

The expand operation picks the best node from the best expandable node queue, preferably without removing the node from the queue. The expansion method is looked up in a generate table based on the expansion counter and the expansion operation is called. Generate methods can introduce new nodes into the tree based on the node they are expanding, and can set the depth counter of new nodes to be the expanded node depth+1, Generate methods also compute new commands to apply to the current node state and forward simulate the dynamics and kinematics to generate new kinodynamic nodes. Generated nodes have their expansion counters set to a function of their depth counters to encourage the search to expand closer to the root of the tree so that the best action is selected from the root node. Thereafter, the expansion operation can score new nodes using the evaluators to get node cost. The expand operation increments the expansion counter of the node and if that counter is MaxExpansions, the counter is removed from the best expandable node queue. Finally, the expand operation can insert all of the generated nodes into the best node queue (the best node queue being a priority ordered queue by node cost) and inserts the generated nodes into the best expandable node queue only if their depth is MaxDepth. This prevents the spurious examination of leaf nodes already at the time horizon/depth limit in future search cycles.

If an expansion operation ends up with a new node on the best node queue, the refinement set can be cleared and re-populated with all nodes in the tree (except for the new node and its parent) as a new refinement set. This is done to cause refinement to refine each pair only once.

Removing nodes from the best expandable node queue can efficiently deal with dead ends in the search space and can provide good performance because the search is not trying to find an optimal path but rather a "good enough" path that is kinematically and dynamically feasible.

The generate table in accordance with the present teachings can comprise an indexed array of methods that can generate various possible future options from a given node. An example of heuristically-ordered generate operations is:

Zero acceleration extension: 1 new node

Stop command: 1 new node, tries to reach zero velocity from any state

¼ max acceleration expansion: 9 new nodes as cross product of accelerations [−¼, 0, ¼]

½ max acceleration expansion: 8 new nodes as cross product of accelerations [−½, 0, ½] skipping [0,0]

Max acceleration expansion: 8 new nodes as cross product of accelerations [1,0,1] skipping [0,0]

10 random: 10 new nodes as a sampling of 10 random bounded accelerations

¾ max acceleration expansion: 8 new nodes as cross product of accelerations [−¾, 0, ¾]

20 random: 20 new nodes as a sampling of 20 random bounded accelerations

A generate table as set forth above can create a dynamically feasible motion plan with bounded, discontinuous acceleration and continuous, limited velocities that are key properties for feasible remote vehicle paths. The simulation functions, which call the plug-in dynamics and kinematic models for a particular remote vehicle, can enforce known (from feedback) and configured (based on properties) limits on acceleration and velocity (and position in the case of steering systems).

The refine operation is handled by getting the top node from the best node queue and the second node by picking the first node in the refinement set (and removing the node from the refinement set). The operation is only applied if neither of the nodes is the child the other. If two good nodes for the refine operation cannot be found, the refine operation can be skipped. Nodes are not removed from the best node queue. After the refine operation, the tree can be traced until a common ancestor is reached between the two best nodes. The refine operation can then generate a new node that is at a midpoint (e.g., by an acceleration command) of the two best nodes from their common ancestor to explore a more refined path. The new node can be added to the ancestor node with the ancestor node depth+1, costs can be evaluated, and the new node can be added to the best node queue. If the resulting depth of the new node is ≤MaxDepth, the node is also added to the best expandable node queue. The expansion counters for the common ancestor node can be updated and, if the node is expanded beyond MaxExpansion, the common ancestor node can be removed from the best expandable node queue.

If creation of the new node results in a new best node at the head of the best node queue, the refinement set can be cleared again and re-populated with all of the nodes in the tree except for the new node and its parent, to ensure that each pair is refined only once. Refine can reduce remote vehicle energy usage.

The search algorithm proceeds, alternating expand and refine operations on the tree, exploring future feasible options as best it can until one of following termination conditions is used to extract the best available command. These termination conditions make this search part of the class of anytime algorithms, which use as much time/resources as available to make find a best feasible action, not necessarily a globally optimal action. Termination conditions include:

A time limit for getting an answer is reached

The best node queue becomes empty (the tree is all expanded out)

The node cost of the best node goes below a "good enough" threshold in which case the search sends the current best feasible action at the time the node cost of the best node goes below the "good enough" threshold.

The best command is extracted by picking the best node from the best node queue (or best node in tree) and tracing the parent links backward until the root node is located. The command used to generate the node before the root node on this traversal is the best available command from the current state, given the goals and constraints at the current moment in time and the best available command can be sent to the actuators of the system as the dynamically and kinematically best feasible command found within the available constraints.

A search algorithm in applying the above command search strategy can be more efficient (since it incorporates node evaluation information incrementally) and more capable (since it can reason about a much wider class of future command options) than existing action selection engines. The algorithm can provide significant improvements in OD/OA and path following along with a reduction in required CPU cycles for the same or better behavioral performance.

Figure 22A:
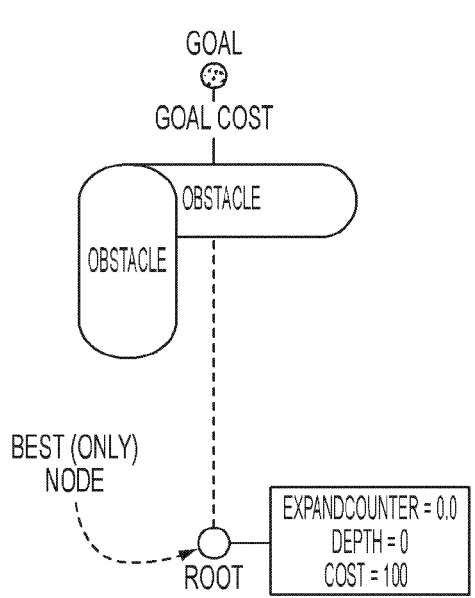
FIGS. 22A-22E schematically illustrate an exemplary embodiment of an operation of the KFDMP algorithm as it expands the search for a good node and best available action.
Figure 22B:
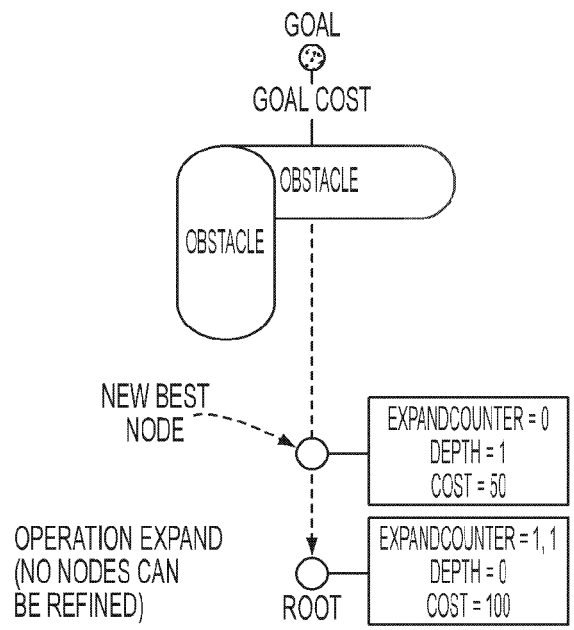
Figure 22C:
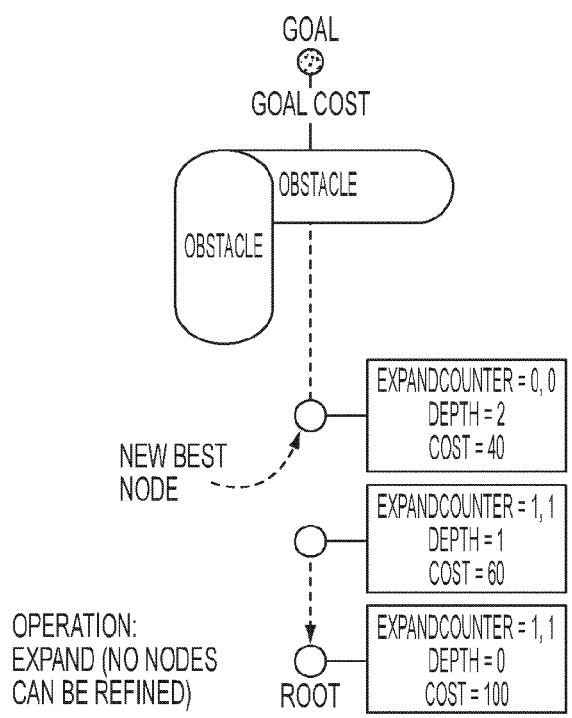
Figure 22D:
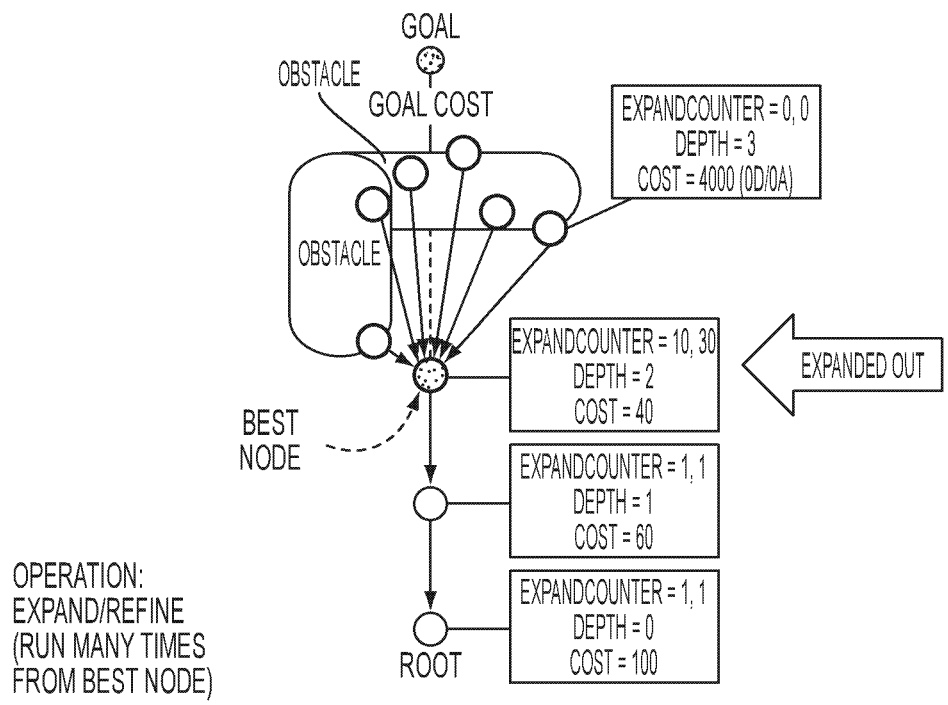
Figure 22E:
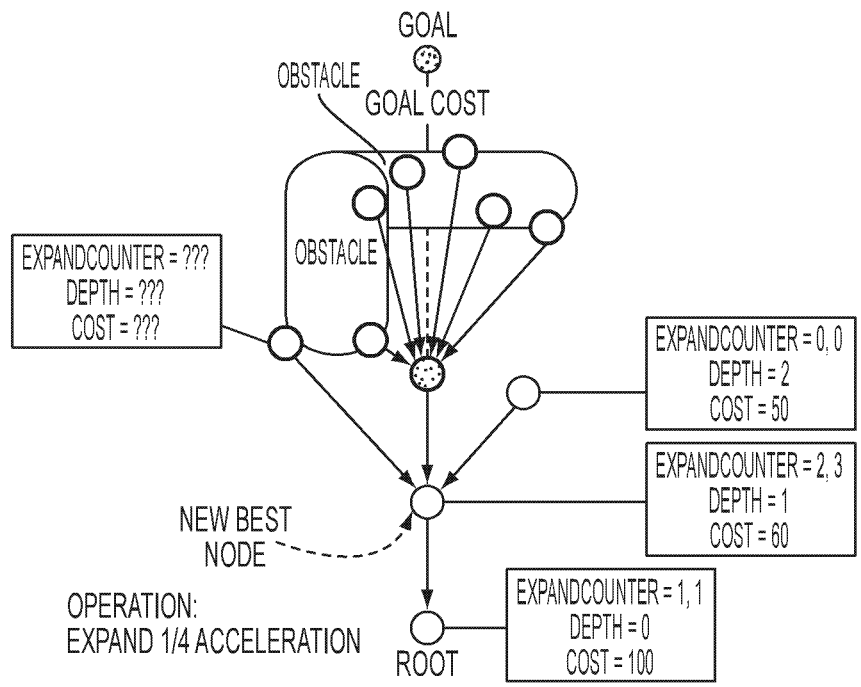

FIGS. 22A-22E illustrate an exemplary embodiment of an operation of the KFDMP algorithm as it expands the search for a good node and best available action. FIG. 22A shows an exemplary initial planning state and initial expansion of nodes until an obstacle is reached in the search space. FIGS. 22B to 22D show the continued expansion of attempts to find a feasible action that improves the search from the near-colliding node. At some point the search gives up on its current best node because the current best node's expansion counters have reached the limit for that node depth, then in FIG. 22E it expands a new "best node" because the previous best node was "expanded out."

Figure 23A:
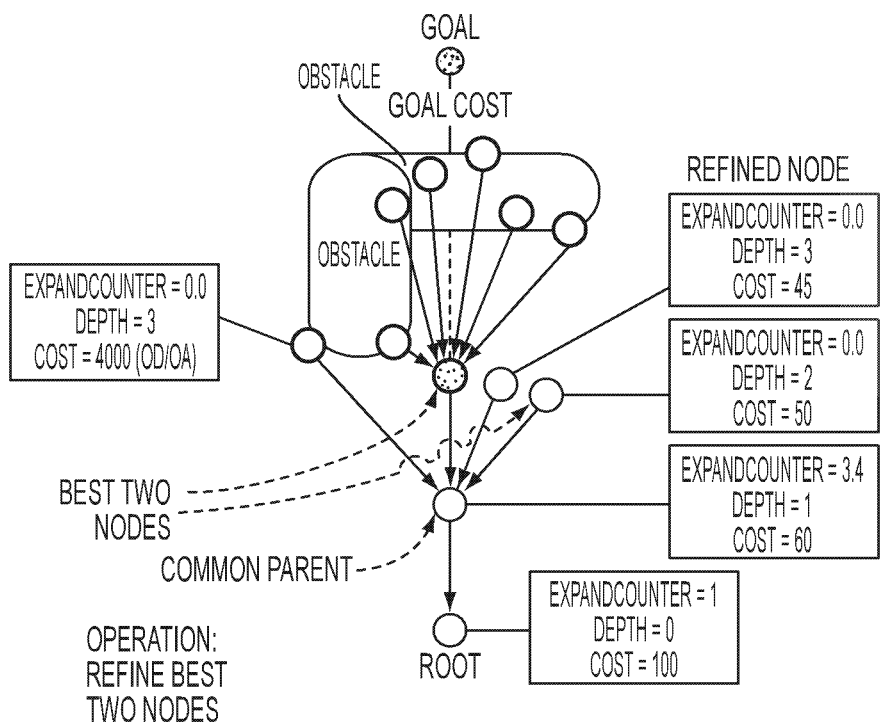
Figure 23B:
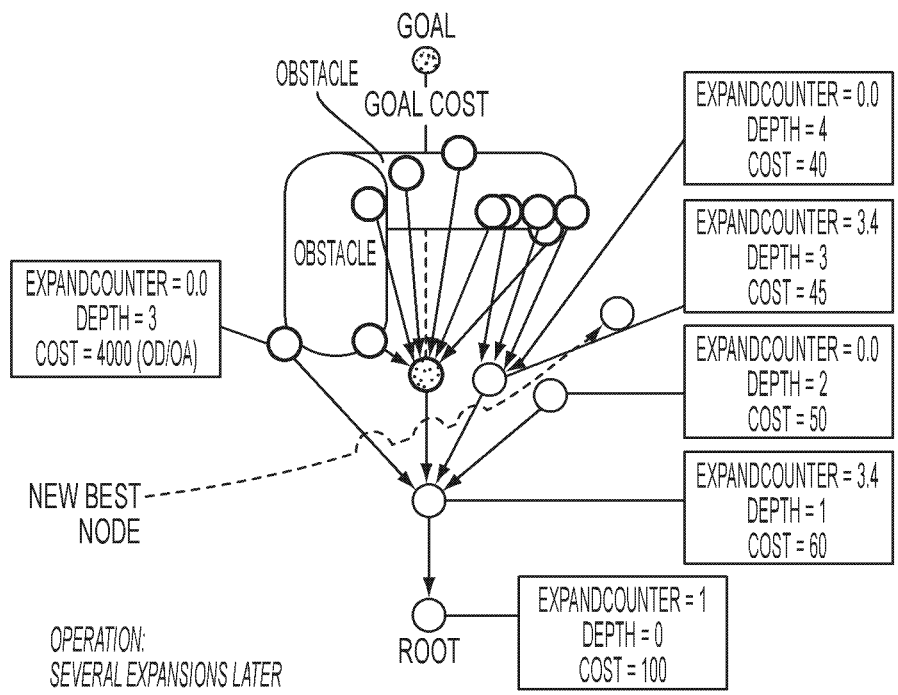
Figure 23C:
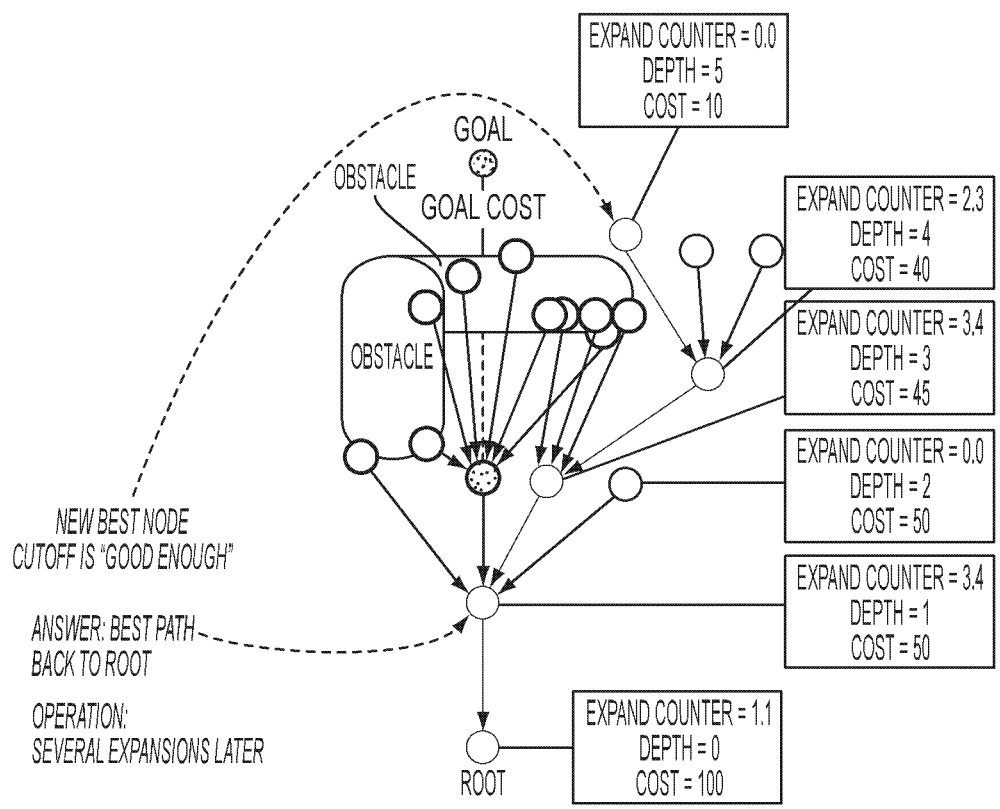

FIGS. 23A-23C illustrate an exemplary refinement of the KFDMP operation illustrated in FIGS. 22A-22E. FIGS. 23A-23C illustrate refinement of a node picked between the two best nodes and of FIG. 22E, and a subsequent expansion of the picked node around the obstacle. Expansion operations are continued until a "good enough" node cost is found. This "good enough" node is used to trigger a termination condition of the search and return a best feasible command to take for this cycle.

In various embodiments of the present teachings, a basic search concept of the KFDMP algorithm can be enhanced based on the fact that the search chooses commands from the root node to the first layer of nodes in the tree. To produce smoothly varying commands and have as much command diversity as possible, the present teachings contemplate expanding-out the root node as the first step in the search. The root node will be continually expanded and the tree refined as in the search algorithm above to create a "bush" of nodes to seed a diverse first layer of a search. The remainder of the search can continue as set forth above.

An optional approach for speeding up planning is the use of node and tree caching. By keeping the tree (or at least a portion thereof) between separate search cycles and looking for the tree node "nearest" to the new feedback position from the remote vehicle, the search algorithm can (within a tolerance) reuse the previous search tree (re-rooting it at the new node and clearing counters, etc.) allowing the search engine to build upon the previous search tree without re-computing the dynamic and kinematic simulations of nodes or adding them to the tree. This can allow reuse of significant portions of a previously successful search tree, although given that the algorithm is a reactive planner, the functions must be called again on any reused search nodes because the world is assumed to change between planning cycles. The evaluation calls are among the more expensive operations on the tree, but reusing cached nodes can still speed up the system.

In addition to caching search trees and reusing nodes, an ongoing stable of evaluators and generators can be created in accordance with the present teachings to improve performance and increase the number of environments where the KFDMP algorithm generates high quality actions. The KFDMP algorithm can be extended and customized by adding a separate table of expansion operators or evaluators that are applied only to nodes of a given depth of tree. This is a kind of generate-evaluate scheduling for the search can refine search performance. Even nodes of depth zero can be generated and/or evaluated with a table of expansion operators or evaluators in accordance with certain embodiments of the present teachings.

In certain embodiments, the KFDMP algorithm can additionally be adaptive and self-tuning to some extent. The expansion table used to generate nodes can be "shuffled" between planning iterations and performance over several planning iterations can be assessed so that the outer planning loop occasionally tries a different shuffling order of expansion operations. Such shuffling can protect the KFDMP algorithm from being "overly tuned" for particular situations or environments and stuck with a static generate table. Shuffling can be implemented by having an integer array that is the current shuffle order and using the generate index to look up the proper generate method during a search from the set of generates (in a separate array). Between runs, a decision is made based on search performance (e.g., number of nodes, cost of eventual best node, time required, etc.), and the decision is used to either shuffle the intermediate generate index table or not.

Lastly, the present teachings contemplate optional tuning of a branching factor and the staging of limits on expansion at different depths that are intended to force a good balance of expansion from the root node versus making the tree grow deeper into the future. This balance should be tuned properly to provide a best feasible action for right now, which takes into account future consequences of the action as much as the system can computationally afford.

Thus, the best path is dynamically maintained and can be deformed based on actual dynamics (e.g., tracking of the remote vehicle) on a sensed path (local planning). The KFDMP algorithm provides improved path planning by incorporating incremental changes into randomized planning. It can for example, recognize the best two nodes at a given time in path planning, and can try a last best path as well as a predefined number (e.g., 6-7) of paths around the last best path.

During path planning, the last best path can become invalid if intersects an obstacle. If the last best path becomes invalid, the present teachings contemplate "dumping" at least a portion of the last best path.

Manipulator Resource Controller: In accordance with embodiments of the present teachings, implementation of a manipulator resource controller can follow the same general structure described above with respect to the drive resource controller, but employ customized generation methods and state types that carry kinematic states in addition to actuator states.

The basic search approach can be customized through a manipulator-specific generate table that performs expansion operators designed for manipulator control. In addition to generate table customizations, the search approach in the manipulator resource controller can separate out the search so that it searches along subsets of actuators, similar to the action spaces concept used in some existing action selection engines. Thus, the manipulator resource controller internals will parallel the drive resource controller internals to a degree, with some customizations within the KFDMP framework.

The present teachings provide design classes and interfaces for an advanced behavior engine. The design can use a gaming industry behavior tree concept to address several key issues that limit the usability and scalability of existing behavior systems, including:

Eliminating "big blob" behaviors with ad-hoc APIs and replaces them with well-defined resource controller APIs.

Separating the action selection search from the behavioral logic of the application, allowing more parallelism in the implementation as well as simplification of the behavior system design.

Supporting more significant autonomy through improved support for conditional execution, looping, sequencing, and finite state machines in behavioral logic trees.

Providing base classes and utility interfaces to simplify writing customized behaviors and conditions that plug into this framework.

Defining an assemblage concept (collections of behaviors encoded for reuse) that can help scalability by providing coarse-grained reusable building blocks.

Defining a simple working memory interface that allows blackboard data sharing between behaviors for high cohesion and low coupling between behaviors.

Describing the implementation details of an improved kinodynamic search engine for the drive controller (and its application to the manipulation control) that can provide faster and smarter action selection for all remote vehicles.

The present teachings thus use forward kinematics (moving from command space to Cartesian space) for the drive resource controllers, although reverse kinematics may be employed in any manipulator resource controllers. Therefore, nodes are grown in the resource controller in command space, which simplifies implementation of selected commands. Existing resource controllers typically plan in Cartesian space, having to translate a selected action into command space for a subject remote vehicle via reverse kinematics.

During node growing, the present teachings contemplate accommodating typically-encountered standard deviations. Sensors and actuators that make up robotics systems are not deterministic. They are subject to error from a variety of sources whether it be internal estimation error or errors incurred by uncontrolled environments. An advanced behavior engine in accordance with the present teachings can provide a field to model the error with standard deviation for all states in the system. This allows remote vehicle resources to report their uncertainty to, for example, action models through state feedback and allows behaviors to consider uncertainty when making a decision. For example, consider a drive system that naturally slips when it rotates. When the action model for the drive system generates outcome trajectories for a set of commands, it can take this rotation uncertainty into account by providing an increased uncertainty for states in trajectories with more rotation. Simulated trajectories of drive system movement can thus employ an uncertainty region that defines a probably space (e.g., based on a known or estimated standard deviation) in which the drive system will be located at one or more time steps in each trajectory. When the behavior engine evaluates a trajectory, it can consider the uncertainty region(s). A more detailed description of uncertainty regions and their use in another behavior system can be found in priority U.S. patent application Ser. No. 12/100,782, filed Apr. 10, 2008, the contents of which are incorporated herein by reference in their entirety.

In accordance with various embodiments of the present teachings, the behaviors do not evaluate trajectories. The behaviors instead evaluate the nodes as described above, to which the uncertainty region can be applied. Evaluation of the nodes can utilize sensor data. For example, evaluation of a node by a behavior can be based on sensor data that tells the behavior were the remote vehicle will be at a given future time based on the data available from video, radar, LIDAR, UWB, or similar sensors. A more detailed description of using sensor data in node evaluation in another behavior system (that evaluates command outcomes rather than nodes) can be found in priority U.S. patent application Ser. No. 12/100,782, filed Apr. 10, 2008, the contents of which are incorporated herein by reference in their entirety.

While existing systems may plan trajectories into the future, embodiments of the present teachings allow planning to "change its mind" about an existing trajectory and step back one or more nodes to begin planning a new path. A KFDMP algorithm as described above provides improved path planning to plan around obstacles and handle more complex situations. It also simplifies programming by enhancing planning abilities.

In accordance with certain embodiments of the present teachings, each application can choose a best command and then send that command choice to a particular resource controller. Each of the resource controllers then generated a single "overall" command for the entire robotics system 100. The overall command can be sent to the remote vehicle controller 150 for communication to the resource control arbiters 122 for execution on remote vehicle resources 122.

FIG. 24 discloses an exemplary embodiment of a robotics framework that can employ an advanced behavior engine in accordance with the present teachings. The illustrated robotics framework can be used to control a robotics system 100 and can include a static structure 710 in communication with a dynamic structure 720. The static structure 710 can include one or more vertical application programming interfaces (APIs) 712 providing functionality and performance characteristics of the remote vehicle. The APIs 712 of the robotics framework 700, along with other vertical APIs 712, communicate with horizontal interfaces 742 forming a component framework 740.

The dynamic structure 720 can include a metadata module 722 (e.g., XML) and a scripting module 724 (e.g., Python as described hereinabove). In some embodiments, the robotics framework 700 can include a common interfaces API 712A, a behavioral system API 712B, and a local perceptual space API 712C.

Fundamental requirements satisfied by the base framework 700 can include being able to: dynamically create pluggable software components at runtime; dynamically load new pluggable software components at runtime; dynamically configure software component after instantiation as part of creation; and dynamically connect software components as a part of an overall system configuration. The framework 700 can provide complete interface encapsulation so that no implementation instance specific information is seen by clients, and can provide support for extensible and modular APIs that can be expanded without breaking existing client code interfaces. The framework can provide support for smooth evolution of new interfaces within the system without breaking existing client code interfaces, as well as support for multiple, different interfaces to the same coherent software component (in support of evolution, modularity, and reusability).

A component can comprise a replaceable part of a system. Examples of components in the system embodiment described herein include at least the remote vehicle controller 140, the resource controllers 200, the control arbiters 120, the remote vehicle manager 150, and the action models 400. The present teachings contemplate that components can be readily swapped out and replaced by an equivalent component, without affecting the overall operation of the system. The architecture of the robotics system 100 is based on software components, which can be readily replaced without any reworking or recompiling of the source code. To be replaceable, a software component must conform to a set of required and provided interfaces. In much the same way that a new stereo receiver needs to provide different types of inputs and outputs, so it can be hooked up to older or newer audio-visual components, the interfaces of a software component must be compatible with the interfaces of the other components in the system. More specifically, any interfaces that are realized by a software component (i.e., the "provided" interfaces) should remain unchanged, so that other components which use this interface will not have to be changed to remain compliant. Likewise, any interfaces which the component uses to interact with other components must also remain unchanged.

In accordance with certain embodiments of the robotics system 100, a component can be implemented, for example, as a C++ class having properties, interfaces, and connections that are compatible with a base framework. Instances of the components can be dynamically loaded and unloaded at runtime. Each instance of a component is able to support a set of named interfaces, which are derived from a common interface class, to support interface navigation by debugging tools.

An interface can comprise a named set of operations that provide services for other components. For example, a software component which keeps track of appointments might provide an interface that allows another component (e.g., a calendar) to get a list of appointments and display them on a calendar. In order for the calendar component to access the list of appointments, it must establish a "connection" to the interface provided by the appointment tracker component, and one of the operations provided in that interface must be a method to get the requested appointment data and return it. An interface can therefore be defined as a means by which components communicate with one another.

In a robotics system as described herein, an interface can be a named API providing functionality and data, and can be implemented, for example, as a C++ class. Interface classes can have an additional property that they provide full encapsulation and do not expose implementation details to clients. Examples of interfaces in the robotics system 100 include the remote vehicle controller API 142, the behavior API 302, and the action model API 402.

Connections can comprise the wiring that ties components together. While interfaces allow components to talk to one another, interfaces are meaningless if there is no way for one component to specify which other component(s) it wishes to talk to. In order to so specify, a component must establish a connection to the required interface. A familiar analogy is a telephone communications system. In order for two parties to speak with each other on the phone, several things must happen. First, each person must provide an interface for having the conversation. This would be the phone itself, which includes a speaker and microphone for listening and speaking. As long as both parties have a phone, they can talk to each other. However, everyone knows that merely possessing a phone does you little good if you do not know the phone number of the person with whom you wish to speak. That is where connections come in. When you pick up the phone and dial someone's number, you are establishing a connection with them. Once the connection is established, you can talk to each other for as long as the connection is maintained. The robotics system 100 can provide two types of connections: single and multiple. Single connections (specified, for example, by the template ConnectionVar<T>) are appropriate when a component needs to access an interface of a single instance of another component. Multiple interface connections (specified, for example, by the template MultiConnectionVar<T>) are appropriate when a component needs to access an interface of multiple instances of another component.

Beyond the basic component structure, a system in accordance with the present teachings can provide runtime support in the form of Module and Directory classes. The framework is set up to manage a tree of named component instances that represent the primary functionality of a system. The tree of component instances each support an extensible set of named interfaces. Each instance in the tree is a named instance and has a pathname within the module itself. Object instance names are established by this dynamic instance hierarchy of named instances. Each component instance in the dynamic instance tree can support a connection to the interfaces exported by other instances. This wiring happens at runtime and can be used to compose higher-level functionality from components within the system.

Usage of framework-based components happens through the explicit interface connection mechanism in this core module and the exported interface header files for the components in question. No sharing of implementation code is required between components that share an interface; however, sharing of implementation code may be done opportunistically for other reasons.

The base framework can defines the interfaces and provide implementations for building reusable, dynamically loadable, dynamically configurable and dynamically connectable, scriptable pieces of C++ software. These pieces can be called components in the robotics system. The primary means of interface and API definition at the module (executable) level can be through the definition of new C++ class interfaces derived from the base framework. The core framework can provide scaffolding for flexible interfaces and evolution of implementation over time for client code. The runtime infrastructure in a Module (process or executable scope) is initialized by accessing the Module instance's interface for the process. The Module interface can then provides a root directory holding other instances within the module as well as the basic resource loading functionality. Subdirectories can be provided within the module and can nest recursively. The objects can implement the Directory interface and provide a hierarchical namespace for component instances within process scope.

The hierarchical namespace allows modules to be constructed dynamically and organized logically in packages. Hierarchical naming can support human inspection and understanding of what is going on in a software module and allow a local namespace to be established that refers to object instances. Furthermore, hierarchical naming can be used to aid programmatic navigation and configuration of the components within a module.

A module interface can also provide a means to find new factory objects. Each factory instance can create one type of named object (or component). When a module interface searches for a factory instance, it may load new dynamic libraries to bring in needed functionality for the module. A createNew function, for example, on a factory interface returns a new Named interface. The Module interface can also lookup and dynamically load new types from libraries as well, allowing a process to "pick up" the type handling code for a type that was defined after the rest of the process components were deployed.

In certain embodiments of the present teachings utilizing component interfaces, individual services and APIs supported by each component are accessed through, for example, a Component::get method on the instance. This access returns a Named handle to the interface that can be narrowed to a specific interface handle type. Once this initial indirection has taken place, calls through the new interface operate with the overhead of a virtual function call. When use of the interface is complete, the interface can be released by assigning 0 to the handle or allowing the handle to exit scope. An automatic reference counting handles can be used to maintain the reference count on component instances.

In accordance with various embodiments, for each interface type, there can be a matching reference (handle) type. The reference counting handle can be used in the API and provides automatic reference counting support for clients and implementations alike. The reference counting handles can be stored, for example, in STL containers, passed as arguments, created on the stack, assigned, returned, etc., and their semantics can insure proper reference counting. The reference handles can also provide exception safety for reference counting when used properly.

FIGS. 26-32 explain 3D local perceptual space (LPS), which is utilized in embodiments of the advanced behavior engine of the present teachings, for example for obstacle detection/obstacle avoidance. LPS is particularly suitable for obstacle detection/obstacle avoidance because it covers a smaller area (local) and constantly updated. FIG. 25 is a schematic diagram showing input of sensor information that is used to get the remote vehicle chassis location in world coordinates. The remote vehicle chassis location in world coordinates is sent to the resource controllers of the advanced behavior engine. Sensor information includes, in Cartesian space, gyrodometry, a stop detector (Boolean "stopped" or "not stopped" that is used to determine whether gyrodometry values should be changing), an IMU to determine remote vehicle tilt, IMU feedback in the form f accelerations and angular rates, and odometry feedback in the form of drive axis positions and velocities. The remote vehicle kinematic frame states are sent to the IMU in command space coordinates. The kinematic frame states are determined by performing online forward kinematics based on a kinematic model and remote vehicle axis feedback.

FIG. 26 is a schematic diagram showing how a voxel map is built from a multitude of inputs. A voxel is a volume element representing a value on a grid in three-dimensional space. A 3D voxel map built in accordance with FIG. 26 can be use for obstacle detection/obstacle avoidance and in other interpretation modules of the advanced behavior engine. A heuristic analysis is made of the voxel map to detect and avoid obstacles. Regarding the inputs, the stereo point cloud data represents what the remote vehicle sees with a stereo vision camera. The remote vehicle kinematic frame states are derived in command space as shown in FIG. 25. The laser range scan data represents what the remote vehicle sees with a laser range finder. The remote vehicle chassis location and tilt angles are derived in Cartesian space as shown in FIG. 25. The output of the voxel obstacle processor (which applies the heuristic analysis if the voxel map) is a 2D obstacle grid map that can be used by existing obstacle detection/obstacle avoidance processors.

FIG. 27 defines coordinate systems used in LPS and their relationships, including a relationship of remote vehicle head coordinates to remote vehicle chassis coordinates using a kinematic model transform and the relationship of remote vehicle chassis coordinates (command space) to world coordinates (Cartesian space) using a gyrodometry model transform, and then the relationship of the remote vehicle head to an obstacle (or the location of an obstacle on a grid map), which is determined by a sensor located in the remote vehicle head.

FIG. 28 illustrates an exemplary embodiment of a scrolling finite grid map. The grid map scrolls as the remote vehicle reaches an edge of the grid. The grid map stores occupancy values based on sensor reading that detect obstacles. Occupancy values of "obstacle," "free," and "unknown" can be stored on the grid. FIG. 29 illustrates an exemplary embodiment of a scrolling finite voxel map representation, adding a 3D voxel location to the grid of FIG. 28. The voxel can store a density value and the voxel cells can store a total density volume for an entire column and a vector of voxels, one for each slice In accordance with certain embodiments of the present teachings, values of the cells in the grid can be kept between a predetermined minimum and maximum value, which provides a tuning factor and ensures that voxel builder output is in a range expected by clients receiving data from the voxel builder.

FIGS. 30A and 30B provide a flow chart showing an exemplary embodiment of a command selection cycle for a robotics system in accordance with the present teachings. As shown, during a behavior cycle, the behavior engine asks the resource controller and then the behavior tree to configure themselves. Thereafter, the engine asks the behavior tree to evaluate its relevance and cost (based on predetermined thresholds) to determine whether to start individual behaviors. Thereafter, it asks the behaviors whether they can start and, if so, the think( ) cycle begins, which is described above. Behavior goals can then be sent from each separate behavior in the tree to the resource controller. Transactions (e.g., drive here, drive at this velocity, drive with these limits) are then sent from the behaviors to the resource controller. After all the goals are written, the goals are committed, which can trigger compilation of the goals.

During an action selection cycle, the resource controller initializes evaluation of the goals by sending the compiled goals to the evaluator for evaluation. The resource controller then sends a state request to the remote vehicle controller to get a current state of the system (which includes, for example, system actuator states and limits). The resource controller then tells the action model that it is beginning a cycle and the action model sends a system kinematic state to the resource controller. Thereafter, the resource controller calls the evaluator to begin an evaluation cycle and asks the action model to initiate a node tree. Growing of a node tree is described in detail above in detail. After node tree initialization, nodes are generated to grow the tree. Thereafter, a generated tree of nodes having feasible commands and a simulated state for a given time horizon is sent from the action model to the resource controller. The resource controller sends the tree of generated nodes to the evaluator, which returns a cost of each tree node to the resource controller. An exploration heuristic (described hereinabove) is then employed to expand and refine the tree until a best node is selected.

During the exploration heuristic, the resource controller asks the action model to explore best and random nodes (as described above), generating new nodes. The new nodes are sent to the resource controller, which then picks the best two nodes and requests that the action model refine the best two nodes. The new refined nodes are sent to the resource controller. The resource controller sends the refined tree of generated nodes to the evaluator and receives a cost of each node in the refined tree. The exploration heuristic continues until a stop criteria is met (exemplary stop criteria are set forth above), at which time a best node has been selected. The evaluator is notified of the selected best node, the action model is notified of the selected best path, the selected command is sent to the remote vehicle controller for execution, and the command selection cycle can begin again. In certain embodiments, the behavior cycle and the action selection cycle are run on separate threads and therefore are not performed serially. Although the illustrated flow chart is for a drive resource controller, one skilled in the art will understand that a similar flow can be undertaken for a manipulator resource controller or other types of controllers.

Other embodiments of the present teachings will be apparent to those skilled in the art from consideration of the specification and practice of the teachings disclosed herein. It is intended that the specification and examples be considered as exemplary only, with a true scope and spirit of the present teachings being indicated by the following claims.

What is claimed is:

1. A method of generating a command for a remote vehicle controller of a remote vehicle by taking in goals and constraints compiled from behavior inputs, and controlling resources by producing low-level actuator commands that realize goals expressed by the behaviors, the method comprising:
   executing a command by a processor based on a kinodynamic fixed depth motion planning (KFDMP) algorithm to plan paths with longer time horizons and to use incremental feedback from evaluators to select a best feasible course of action;
   electronically providing the best feasible course of action as servo commands to a drive system or a manipulation system of the remote vehicle controller, and
   commanding one or more actuators of the remote vehicle by the remote vehicle controller based on the servo commands;
   wherein the best feasible course of action comprises goal-achieving actions within a fixed time horizon of several seconds from the current time each time a course of action is selected.

2. The method of claim 1, wherein the best feasible actions is dynamically feasible and kinematically feasible.

3. The method of claim 1, further comprising selecting a "good enough" best feasible action that incorporates as much future consequence information as possible given various constraints.

4. The method of claim 1, wherein the KFDMP algorithm abstracts away remote vehicle kinematics and actuators so that same waypoint behaviors work on a variety of remote vehicles.

5. The method of claim 1, wherein the KFDMP algorithm comprises a search tree made of nodes that encode a kinematic and dynamic state variables of the remote vehicle's drive system.

6. The method of claim 1, further comprising constructing a kinodynamic tree by adding nodes that represent a fixed, small $\Delta T$ from the current time, wherein each node is added by assuming a command (acceleration) change is applied during a given time step and is integrated (simulated) through a forward dynamics model and a forward kinematic model of the particular remote vehicle drive system.

7. The method of claim 6, wherein the kinematic model comprises a plug-in object that covers separate classes of vehicles (e.g., cars, tanks, UGVs, etc.) such that a single kinematic model covers a large number of remote vehicles within a class by parameters set in the kinematic model.

8. The method of claim 7, wherein a plug-in model of dynamics and kinematics allows a planning engine of the KFDMP algorithm to handle arbitrary holonomic and non-holonomic drive systems with arbitrary constraints.

9. The method of claim 5, wherein each node of the tree is annotated with a collection of tracking variables in addition to basic dynamic state information, the tracking variables including:
   a command that generated the node;
   a node cost comprising a weighted sum of evaluators applied to the node;
   an expansion index and expansion counter, the expansion index equal to the number of times expansion has been done on a node to drive expansion selection and the expansion counter equal to the number of child nodes added to a node in total; and/or a depth counter.

10. The method of claim 9, wherein the evaluators comprise functions that map nodes to a cost function representing the goals of the remote vehicle as set by the behaviors, and each evaluator handles a different part of the cost and nodes are evaluated based on their cost, which can be a weighted sum of evaluator costs.

11. The method of claim 5, wherein searching for a best feasible action comprises building a tree of a given search depth and accepting a certain maximum branching factor.

12. The method of claim 11, further comprising:
maintaining a priority queue of nodes by node cost;
inserting a root node into a best node queue; maintaining a best expandable node queue containing the best nodes that can still be expanded; and
inserting a first node in both queues,
wherein the queues speed up core search operations of finding the node with the best cost subject to certain criteria.

13. The method of claim 12, further comprising refining the search tree made of nodes, and maintaining a refinement set of nodes to avoid refining the same pairs of nodes over and over.

14. The method of claim 13, wherein the search for a best feasible action proceeds by an alternating sequence of expand and refine operations applied to the tree.

15. The method of claim 14, wherein the KFDMP algorithm proceeds, alternating expand and refine operations on the tree, exploring future feasible options as best it can until one of following termination conditions is used to extract the best available command:

a time limit for getting an answer is reached;

the best node queue becomes empty (the tree is all expanded out); or the node cost of the best node goes below a "good enough" threshold in which case the search sends the current best feasible action at the time the node cost of the best node goes below the "good enough" threshold.

16. The method of claim 15, wherein a best command is extracted by picking the best node from the best node queue and tracing the parent links backward until the root node is located.

17. A robotics system comprising:

a behavior tree comprising a tree of behaviors for controlling remote vehicle resources, the behavior tree generating behavior goals;

one or more action models that generate remote vehicle constraints;

multiple remote vehicle resources;

a control arbiter for each remote vehicle resource, the control arbiter controlling its associated remote vehicle resource;

a remote vehicle controller in communication with the control arbiters; and one or more resource controllers in communication with the remote vehicle controller, the resource controllers receiving the behavior goals and the remote vehicle constraints and generating an overall command which is sent to the remote vehicle controller for execution on the remote vehicle resources.

* * * * *

UNITED STATES PATENT AND TRADEMARK OFFICE
CERTIFICATE OF CORRECTION

| | | |
|---|---|---|
| PATENT NO. | : 8,571,745 B2 | Page 1 of 1 |
| APPLICATION NO. | : 13/105872 | |
| DATED | : October 29, 2013 | |
| INVENTOR(S) | : Pack et al. | |

It is certified that error appears in the above-identified patent and that said Letters Patent is hereby corrected as shown below:

On the Title page please insert:

Item -- [73]: iRobot Corporation, Bedford, MA (US) --

Signed and Sealed this
Eighth Day of April, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,571,745 B2  
APPLICATION NO. : 13/105872  
DATED : October 29, 2013  
INVENTOR(S) : Pack et al.

Page 1 of 1

It is certified that error appears in the above-identified patent and that said Letters Patent is hereby corrected as shown below:

On the Title page, "item [76]" should read -- item [75] --.

On the Title page please insert:

Item -- [73]: iRobot Corporation, Bedford, MA (US) --

This certificate supersedes the Certificate of Correction issued April 8, 2014.

Signed and Sealed this  
Sixth Day of May, 2014

Michelle K. Lee  
*Deputy Director of the United States Patent and Trademark Office*